(12) United States Patent
Gieseke et al.

(10) Patent No.: US 6,350,291 B1
(45) Date of Patent: Feb. 26, 2002

(54) FILTER ARRANGEMENT; SEALING SYSTEM; AND METHODS

(75) Inventors: Steven Scott Gieseke, Richfield; Carolyn J. Finnerty, Bloomington, both of MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 09/502,346

(22) Filed: Feb. 10, 2000

Related U.S. Application Data

(63) Continuation-in-part of application No. 09/258,481, filed on Feb. 26, 1999, now Pat. No. 6,190,432.

(51) Int. Cl.[7] .............................................. B01D 46/24
(52) U.S. Cl. ........................ 55/385.3; 55/498; 55/502; 123/198 E
(58) Field of Search ............................... 55/385.3, 498, 55/502, 503, 504, 506, 507, 488, 510, DIG. 30; 123/198 E

(56) References Cited

U.S. PATENT DOCUMENTS

| | | |
|---|---|---|
| 3,025,963 A | 3/1962 | Bauer |
| 3,209,917 A | 10/1965 | Yelinek |
| 3,676,242 A | 7/1972 | Prentice |
| 3,695,437 A | 10/1972 | Shaltis |
| 3,807,150 A | 4/1974 | Maracle |
| 3,841,953 A | 10/1974 | Lohkamp et al. |
| 3,849,241 A | 11/1974 | Butin et al. |
| 3,878,014 A | 4/1975 | Melead |
| 4,065,341 A | 12/1977 | Cub |
| 4,322,231 A | 3/1982 | Hilzendeger et al. |
| 4,402,830 A | 9/1983 | Paul |
| 4,449,993 A | 5/1984 | Bergeron |
| 4,925,561 A | 5/1990 | Ishii et al. |
| 5,304,312 A | 4/1994 | Forster et al. |
| 5,350,515 A | 9/1994 | Stark et al. |
| 5,415,677 A | 5/1995 | Ager et al. |
| 5,435,870 A | 7/1995 | Takagaki et al. |
| 5,484,466 A | 1/1996 | Brown et al. |
| 5,487,767 A | 1/1996 | Brown |
| 5,543,007 A | 8/1996 | Takagaki et al. |
| 5,547,480 A | 8/1996 | Coulonvaux |
| 5,613,992 A | 3/1997 | Engel |

(List continued on next page.)

FOREIGN PATENT DOCUMENTS

| | | |
|---|---|---|
| EP | 0 376 443 A2 | 7/1990 |
| EP | 0 581 695 A1 | 2/1994 |
| EP | 0 704 233 A1 | 4/1996 |
| GB | 703823 | 2/1954 |
| GB | 1275651 | 5/1972 |
| WO | WO 97/40908 | 11/1997 |
| WO | WO 97/40910 | 11/1997 |
| WO | WO 97/41939 | 11/1997 |

OTHER PUBLICATIONS

Declaration of Steven S. Gieseke with Exhibits A, B, and C (5 pages).

*Primary Examiner*—David A. Simmons
*Assistant Examiner*—Minh-Chau T. Pham
(74) *Attorney, Agent, or Firm*—Merchant & Gould P.C.

(57) ABSTRACT

A filter pack includes a filter construction and a sealing system for sealing the construction within a duct or housing. The filter construction has first and second opposite flow faces and is configured for a straight-through flow. The sealing system includes a frame construction and a compressible seal member. The compressible seal member is molded around a portion of the frame construction. The compressible seal member is sufficiently compressible to form a radial seal between and against the frame construction and a surface of a housing when the filter pack is inserted within the housing.

20 Claims, 16 Drawing Sheets

U.S. PATENT DOCUMENTS

| | | |
|---|---|---|
| 5,645,718 A | 7/1997 | Hardison et al. |
| 5,685,985 A | 11/1997 | Brown et al. |
| 5,714,126 A | 2/1998 | Frund |
| 5,730,766 A | 3/1998 | Clements |
| 5,755,843 A | 5/1998 | Sundquist |
| 5,863,313 A | 1/1999 | Coulonvaux |
| 5,897,676 A | 4/1999 | Engel |
| 5,820,646 A | 10/1999 | Gillingham et al. |
| 6,190,432 B1 * | 2/2001 | Gieseke et al. ............... 55/498 |

\* cited by examiner

FILTER ARRANGEMENT; SEALING SYSTEM; AND METHODS

CROSS-REFERENCE TO RELATED APPLICATIONS

This application is a continuation-in-part of U.S. application Ser. No. 09/258,481, filed Feb. 26, 1999 now U.S. Pat. No. 6,190,432B1. The specification of 09/258,481 is incorporated by reference herein.

FIELD OF THE INVENTION

This disclosure concerns filter constructions for engines and methods of filtering and filter preparation. In particular, the disclosure describes a filter arrangement having a sealing system.

BACKGROUND OF THE INVENTION

Gas streams often carry particulate material therein. In many instances, it is desirable to remove some or all of the particulate material from a gas flow stream. For example, air intake streams to engines for motorized vehicles or power generation equipment, gas streams directed to gas turbines, and air streams to various combustion furnaces, often include particulate material therein. The particulate material, should it reach the internal workings of the various mechanisms involved, can cause substantial damage thereto. It is therefore preferred, for such systems, to remove the particulate material from the gas flow upstream of the engine, turbine, furnace or other equipment involved. A variety of air filter or gas filter arrangements have been developed for particulate removal. In general, however, continued improvements are sought.

SUMMARY OF THE DISCLOSURE

This disclosure describes an engine air flow system. The air flow system comprises a filter element construction including a media pack and a sealing system. In preferred configurations, the sealing system will have a frame arrangement and a seal member, where the frame arrangement includes an extension projecting axially from one of the flow faces of the media pack. In particularly preferred arrangements, the seal member is supported by the extension of the frame arrangement.

Filter element constructions are described herein. Preferred filter element constructions will include ones such as those characterized above.

Methods of filtering systems, servicing filtration systems, and constructing filter arrangements are described herein. Preferred methods will use filter elements and constructions as characterized above.

DETAILED DESCRIPTION

A. FIGS. 1–7

Figure 1:
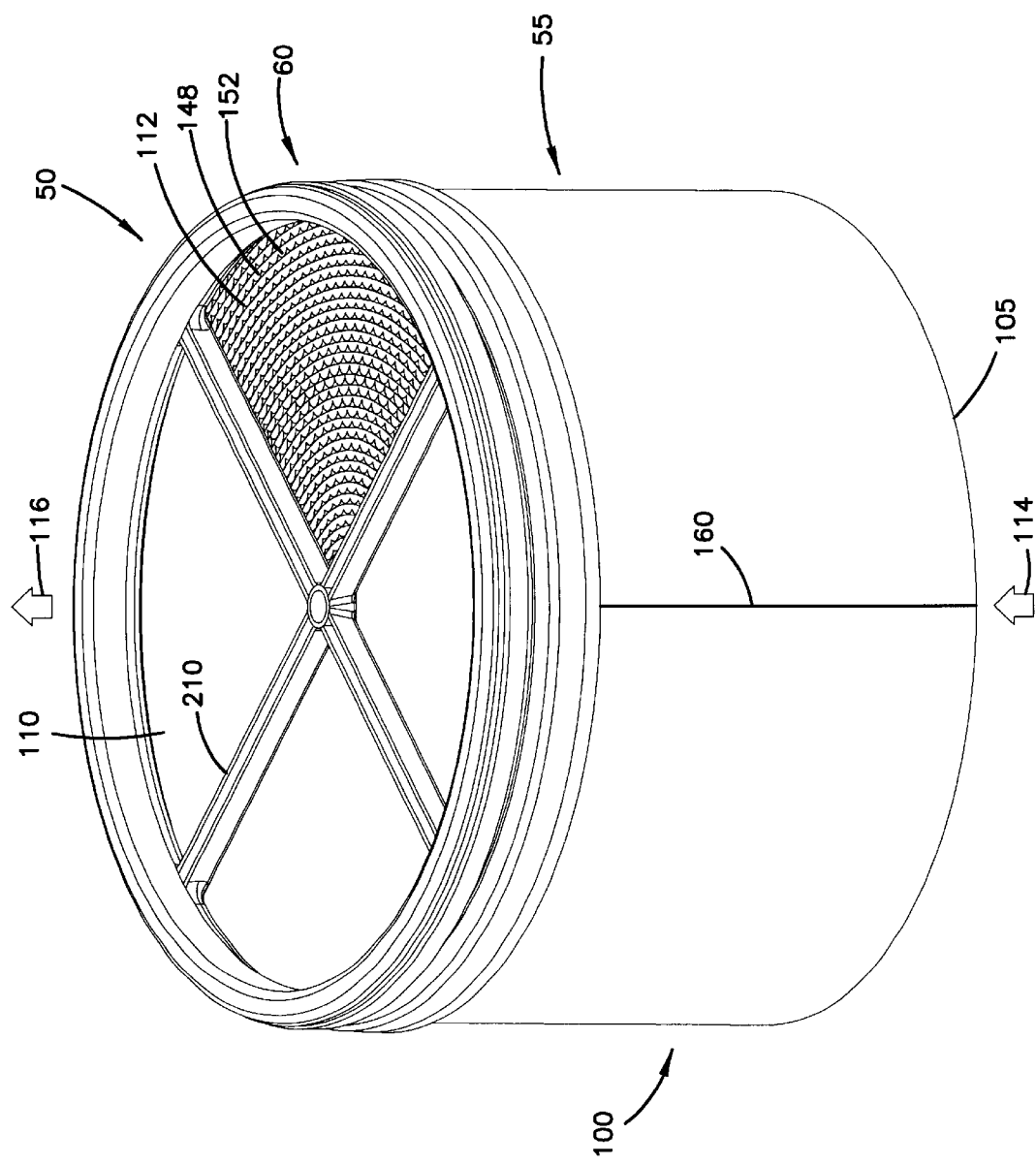
FIG. 1 is a schematic, perspective view of one embodiment a filter pack, according to certain principles of this disclosure.
Figure 8:
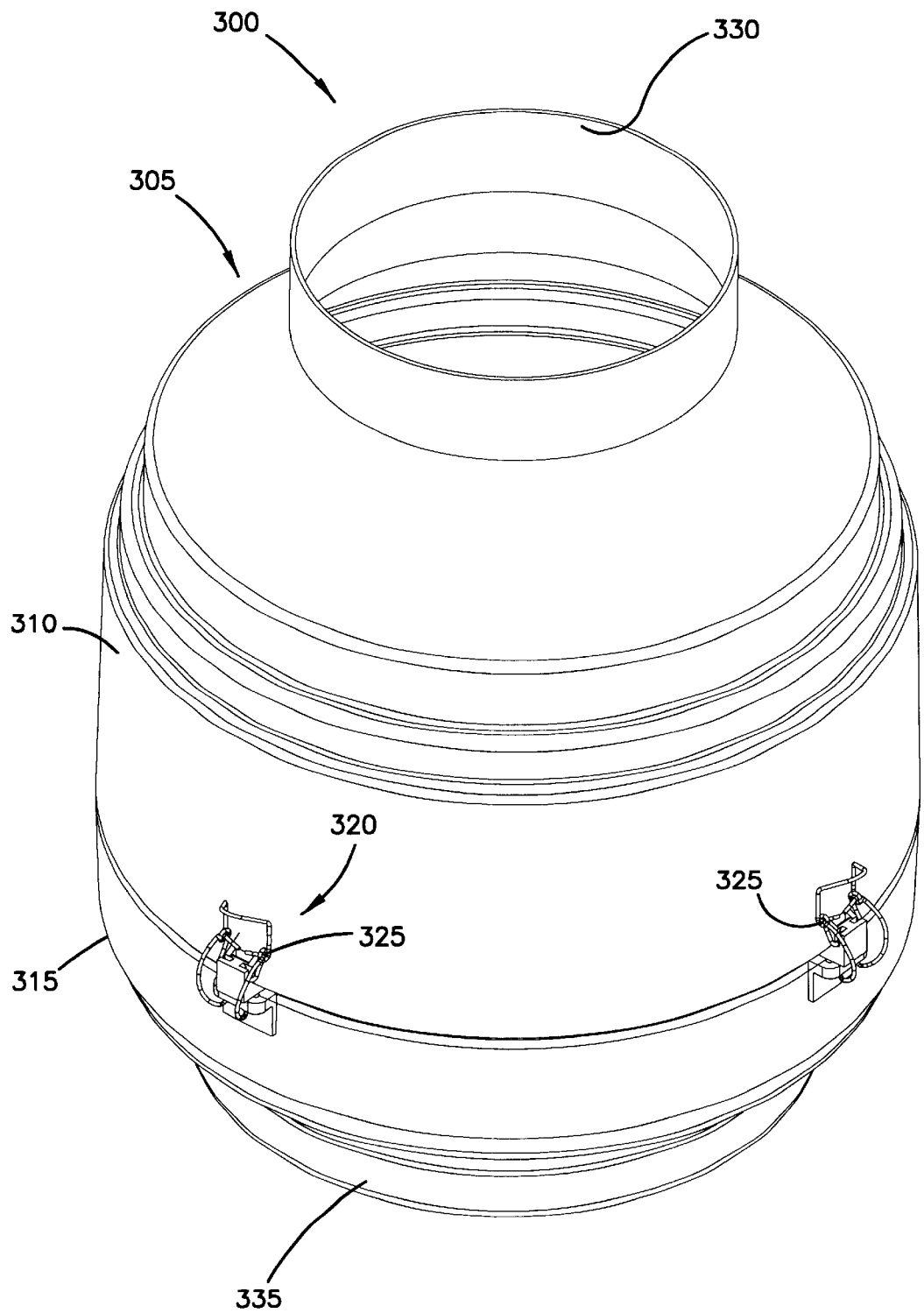
FIG. 8 is a schematic, perspective view of one embodiment of an air cleaner, in which a filter pack according to principles of this disclosure can be used.
Figure 9:
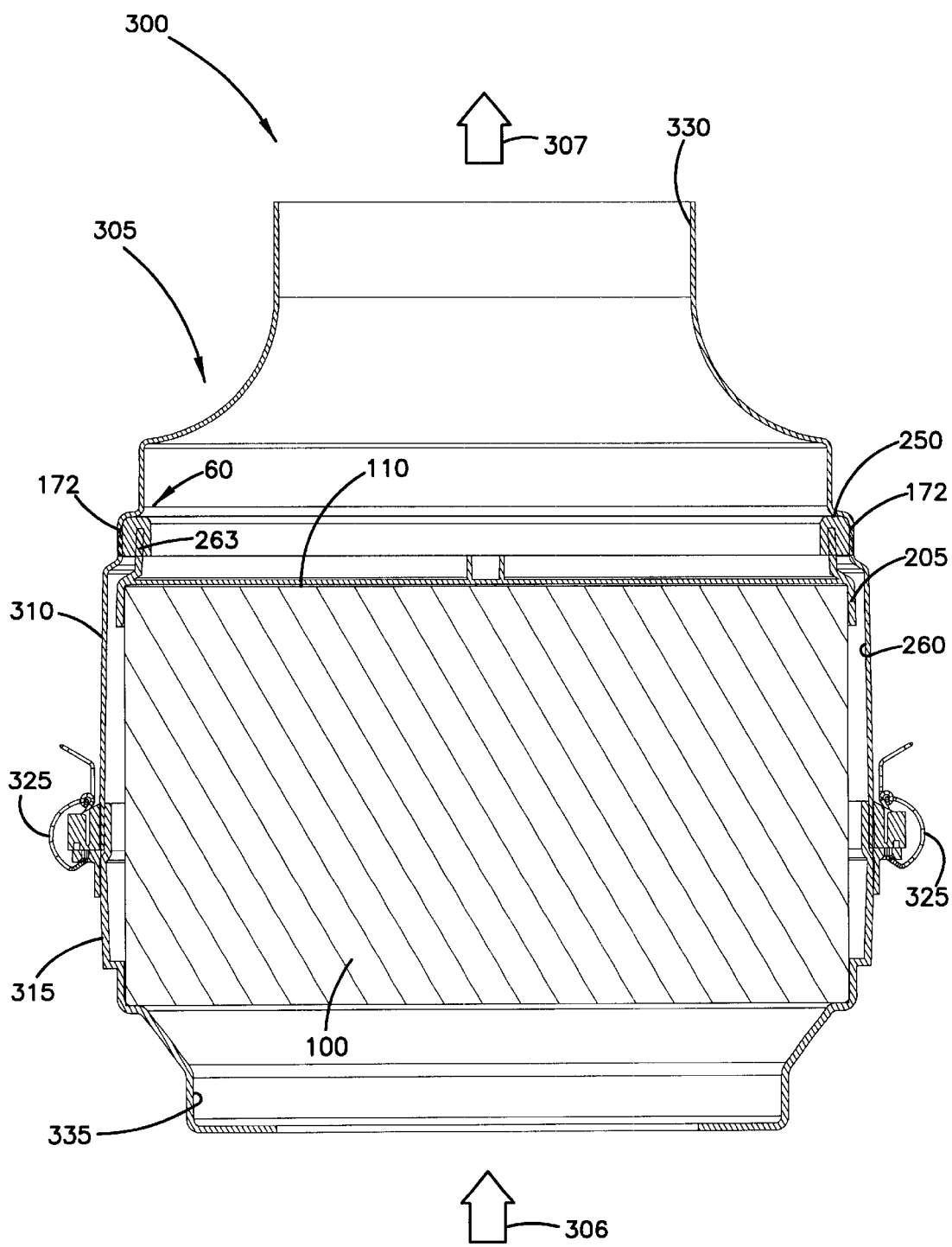
FIG. 9 is a schematic, cross-sectional view of the air cleaner depicted in FIG. 8, showing the filter pack depicted in FIG. 1 installed therewithin.

Attention is directed to FIG. 1. FIG. 1 is a perspective view of a first embodiment of a filter pack 50. The preferred filter pack 50 depicted includes filter media 55 and a sealing system 60. In preferred constructions, the filter media 55 is designed to remove particulates from a fluid, such as air, passing through the filter media 55, while the sealing system 60 is designed to seal the filter pack 50 against a sidewall of a housing or duct, as shown in FIGS. 8 and 9. By the term "seal," it is meant that the sealing system 60, under normal conditions, prevents unintended levels of fluid from passing through a region between the filter pack 50 and the sidewall of the housing or duct; i.e., the sealing system 60 inhibits fluid flow from avoiding passage through the filtering media 55 of filter pack 50.

In certain preferred arrangements, the filter media 55 will be configured for straight-through flow. By "straight-through flow," it is meant that the filter media 55 is configured in a construction 100 with a first flow face 105 (corresponding to an inlet end, in the illustrated embodiment) and an opposite, second flow face 110 (corresponding to an outlet end, in the illustrated embodiment), with fluid flow entering in one direction 114 through the first flow face 105 and exiting in the same direction 116 from the second flow face 110. When used with an inline-flow housing, in general, the fluid will enter through the inlet of the housing in one direction, enter the filter construction 100 through the first flow face 105 in the same direction, exit the filter construction 100 in the same direction from the second flow face 110, and exit the housing through the housing outlet also in the same direction.

Although the first flow face 105 is described above as corresponding to an inlet end, and the second flow face 110 is described above as corresponding to an outlet end, the inlet and outlet ends can be reversed. That is, the first flow face 105 depicted in FIG. 1 can correspond to an outlet end, while the second flow face 110 depicted in FIG. 1 can correspond to an inlet end.

In FIG. 1, the first flow face 105 and the second flow face 110 are depicted as planar and as parallel. In other embodiments, the first flow face 105 and the second flow face 110 can be non-planar, for example, frusto-conical. Further, the first flow face 105 and second flow face 110 need not be parallel to each other.

Generally, the filter construction 100 will be a wound construction. That is, the construction 100 will typically include a layer of filter media that is turned completely or repeatedly about a center point. Typically, the wound construction will be a coil, in that a layer of filter media will be rolled a series of turns around a center point. In arrangements where a wound, coiled construction is used, the filter construction 100 will be a roll of filter media, typically permeable fluted filter media.

Figure 2:
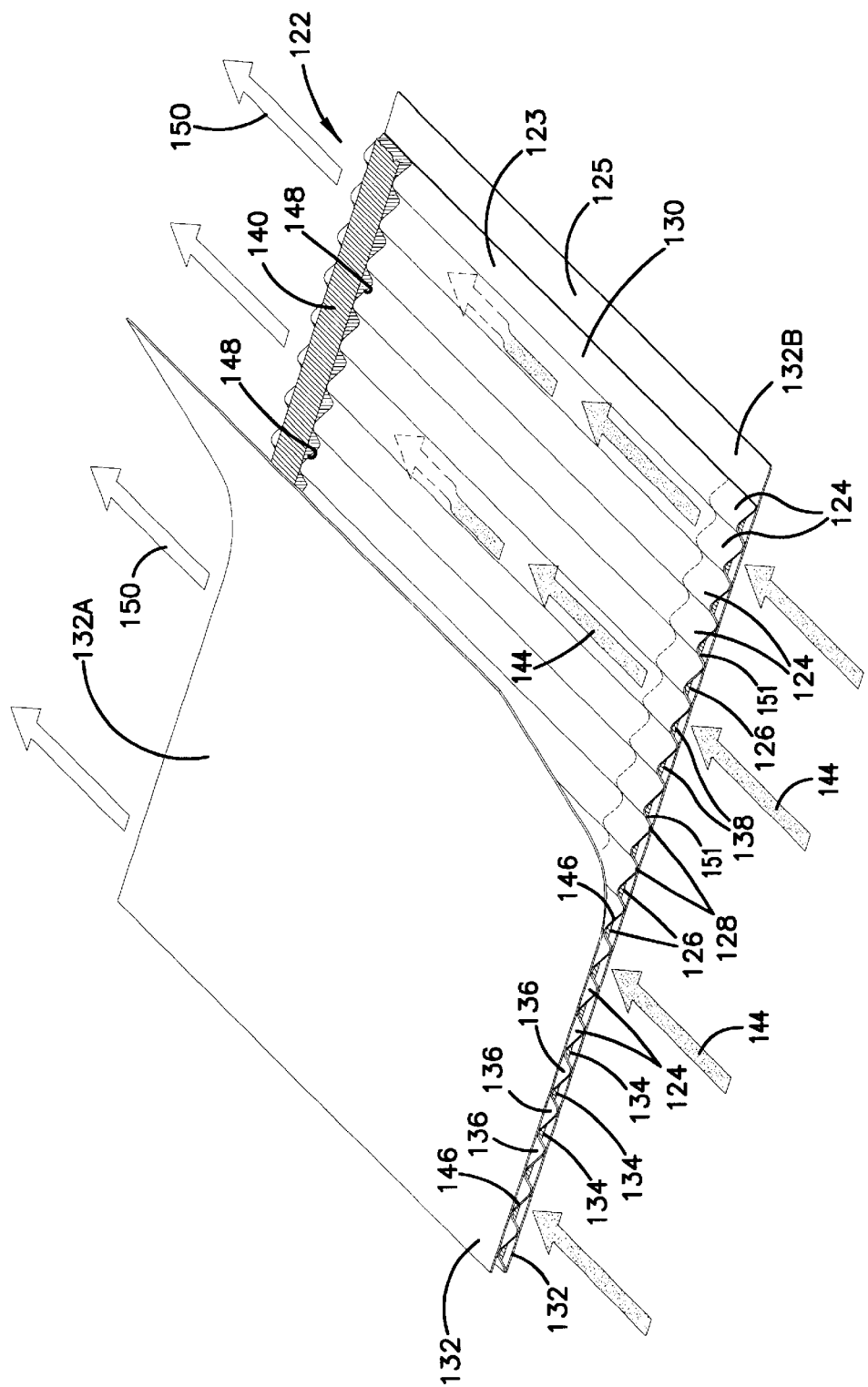
FIG. 2 is a schematic, perspective view of a portion of filter media usable in the arrangements of FIG. 1.

Attention is now directed to FIG. 2. FIG. 2 is schematic, perspective view demonstrating the principles of operation of certain preferred media usable in the filter constructions herein. In FIG. 2, a fluted construction is generally designated at 122. Preferably, the fluted construction 122 includes: a layer 123 of corrugations having a plurality of flutes 124 and a face sheet 132. The FIG. 2 embodiment shows two sections of the face sheet 132, at 132A (depicted on top of the corrugated layer 123) and at 132B (depicted below the corrugated layer 123). Typically, the preferred media construction 125 used in arrangements described herein will include the corrugated layer 123 secured to the bottom face sheet 132B. When using this media construction 125 in a rolled construction, it typically will be wound around itself, such that the bottom face sheet 132B will cover the top of the corrugated layer 123. The face sheet 132 covering the top of the corrugated layer is depicted as 132A. It should be understood that the face sheet 132A and 132B are the same sheet 132.

When using this type of media construction 125, the flute chambers 124 preferably form alternating peaks 126 and troughs 128. The troughs 128 and peaks 126 divide the flutes into an upper row and lower row. In the particular configuration shown in FIG. 2, the upper flutes form flute chambers 136 closed at the downstream end, while flute chambers 134 having their upstream end closed form the lower row of flutes. The fluted chambers 134 are closed by a first end bead 138 that fills a portion of the upstream end of the flute between the fluting sheet 130 and the second facing sheet 132B. Similarly, a second end bead 140 closes the downstream end of alternating flutes 136. In some preferred systems, both the first end bead 138 and second end bead 140 are straight along all portions of the media construction 125, never deviating from a straight path. In some preferred systems, the first end bead 138 is both straight and never deviates from a position at or near one of the ends of the media construction 125, while the second end bead 140 is both straight and never deviates from a position at or near one of the ends of the media construction 125. The flutes 124 and end beads 138, 140 provide the media construction 125 that can be formed into filter construction 100 and be structurally self-supporting without a housing.

When using media constructed in the form of media construction 125, during use, unfiltered fluid, such as air, enters the flute chambers 136 as indicated by the shaded arrows 144. The flute chambers 136 have their upstream ends 146 open. The unfiltered fluid flow is not permitted to pass through the downstream ends 148 of the flute chambers 136 because their downstream ends 148 are closed by the second end bead 140. Therefore, the fluid is forced to proceed through the fluting sheet 130 or face sheets 132. As the unfiltered fluid passes through the fluting sheet 130 or face sheets 132, the fluid is cleaned or filtered. The cleaned fluid is indicated by the unshaded arrow 150. The fluid then passes through the flute chambers 134 (which have their upstream ends 151 closed) to flow through the open downstream end 152 (FIG. 1) out the fluted construction 122. With the configuration shown, the unfiltered fluid can flow through the fluted sheet 130, the upper facing sheet 132A, or lower facing sheet 132B, and into a flute chamber 134.

Typically, the media construction 125 will be prepared and then wound to form a rolled construction 100 of filter media. When this type of media is selected for use, the media construction 125 prepared includes the sheet of corrugations 123 secured with the end bead 138 to the bottom face sheet 132B (as shown in FIG. 2, but without the top face sheet 132A). In these types of arrangements, the media construction 125 will include a leading edge at one end and a trailing edge at the opposite end, with a top lateral edge and a bottom lateral edge extending between the leading and trailing edges. By the term "leading edge", it is meant the edge that will be initially turned or rolled, such that it is at or adjacent to the center or core of the rolled construction. The "trailing edge" will be the edge on the outside of the rolled construction, upon completion of the turning or coiling process.

The leading edge and the trailing edge should be sealed between the corrugated sheet 123 and the bottom face sheet 132B, before winding the sheet into a coil, in these types of media constructions 125. While a number of ways are possible, in certain methods, the seal at the leading edge is formed as follows: (a) the corrugated sheet 123 and the bottom face sheet 132B are cut or sliced along a line or path extending from the top lateral edge to the bottom lateral edge (or, from the bottom lateral edge to the top lateral edge) along a flute 124 forming a peak 126 at the highest point (or apex) of the peak 126; and (b) sealant is applied between the bottom face sheet 132B and the sheet of corrugations 123 along the line or path of cut. The seal at the trailing edge can be formed analogously to the process of forming the seal at the leading edge. While a number of different types of sealant may be used for forming these seals, one usable material is a non-foamed sealant available from H.B. Fuller, St. Paul, Minn., identified under the designation HL0842.

Figure 3:
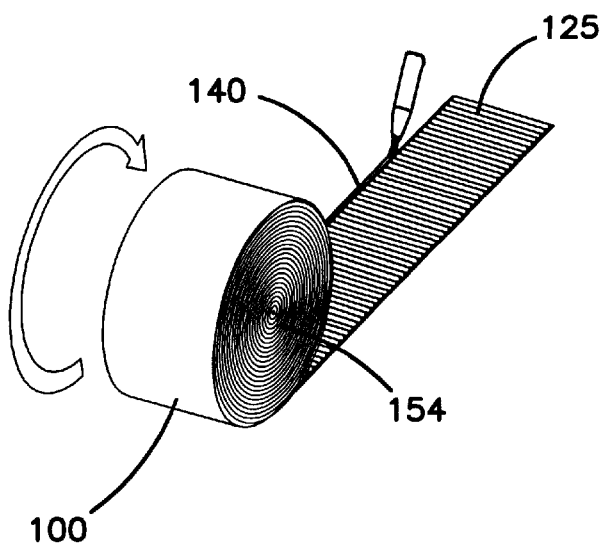
FIG. 3 is a schematic, perspective view of one approach to manufacturing a filter pack usable in the arrangements of FIG. 1.

When using the media construction 125, it may be desired by the system designer to wind the construction 125 into a rolled construction of filter media, such as the filter construction 100 of FIG. 1. A variety of ways can be used to coil or roll the media. Attention is directed to FIG. 3. In the particular embodiment shown in FIG. 3, the media construction 125 is wound about a center mandrel 154 or other element to provide a mounting member for winding. The center mandrel 154 may be removed or left to plug to act as a core at the center of the cylindrical filter construction 100 (FIG. 1). It can be appreciated that non-round center winding members may be utilized for making other filtering media shapes, such as filter media having an oblong, oval, rectangular, or racetrack-shaped profile.

The media construction 125 can also be wound without a mandrel or center core. One method of forming a coreless rolled construction is as follows: (a) the troughs 128 of the first few corrugations of the corrugated sheet 123 spaced from the leading edge are scored from the top lateral edge to the bottom lateral edge (or from the bottom lateral edge to the top lateral edge) to help in rolling the construction 125; for example, the first four corrugations from the leading edge will have a score line cut along the troughs 128; (b) the bead 140 of sealant is applied along the top of the sheet of corrugation 123 along the lateral edge opposite from the lateral edge having end bead 138; (c) the leading edge is initially turned or rolled over against itself and then pinched together to be sealed with the sealant bead 140; and (d) the remaining corrugated sheet 123 having the bottom face sheet 132B secured thereto is coiled or rolled or turned around the pinched leading edge.

In other methods, coreless constructions can be made from the media construction 125 by automated processes, as described in U.S. Pat. Nos. 5,543,007 and 5,435,870, each incorporated by reference herein. In still other methods, the media construction can be rolled by hand.

When using rolled constructions such as the filter construction 100, the system designer will want to ensure that the outside periphery of the construction 100 is closed or locked in place to prevent the filter construction 100 from unwinding. There are a variety of ways to accomplish this. In some applications, the outside periphery is wrapped with a periphery layer. The periphery layer can be a non-porous, adhesive material, such as plastic with an adhesive on one side. When this type of layer is utilized, the periphery layer prevents the filter construction 100 from unwinding and prevents the fluid from passing through the outside periphery of the filter construction 100, maintaining straight-through flow through the filter construction 100.

In some applications, the filter construction 100 is secured in its rolled construction by sealing the trailing edge of the media construction 125 with an adhesive or sealant along a line 160 (FIG. 1) to secure the trailing edge to the outside surface of the filter construction 100. For example, a bead of hot-melt may be applied along the line 160.

Attention is again directed to FIG. 1. In FIG. 1, the second flow face 110 is shown schematically. There is a portion at 112 in which the flutes including the open ends 152 and closed ends 148 are depicted. It should be understood that this section 112 is representative of the entire flow face 110. For the sake of clarity and simplicity, the flutes are not depicted in the other remaining portions of the flow face 110. Top and bottom plan views, as well as side elevational views of a filter pack 50 usable in the systems and arrangements described herein are depicted in copending and commonly assigned U.S. Pat. application Ser. No. 29/101,193, filed Feb. 26, 1999, and entitled, "Filter Element Having Sealing System," herein incorporated by reference.

Turning now to FIG. 9, the filter construction 100 is shown installed in a housing 305 (which can be part of an air intake duct into an engine or turbo). In the arrangement shown, air flows into the housing 305 at 306, through the filter construction 100, and out of the housing 305 at 307. When media constructions such as filter constructions 100 of the type shown are used in a duct or housing 305, a sealing system 60 will be needed to ensure that air flows through the media construction 100, rather than bypass it.

Figure 5:
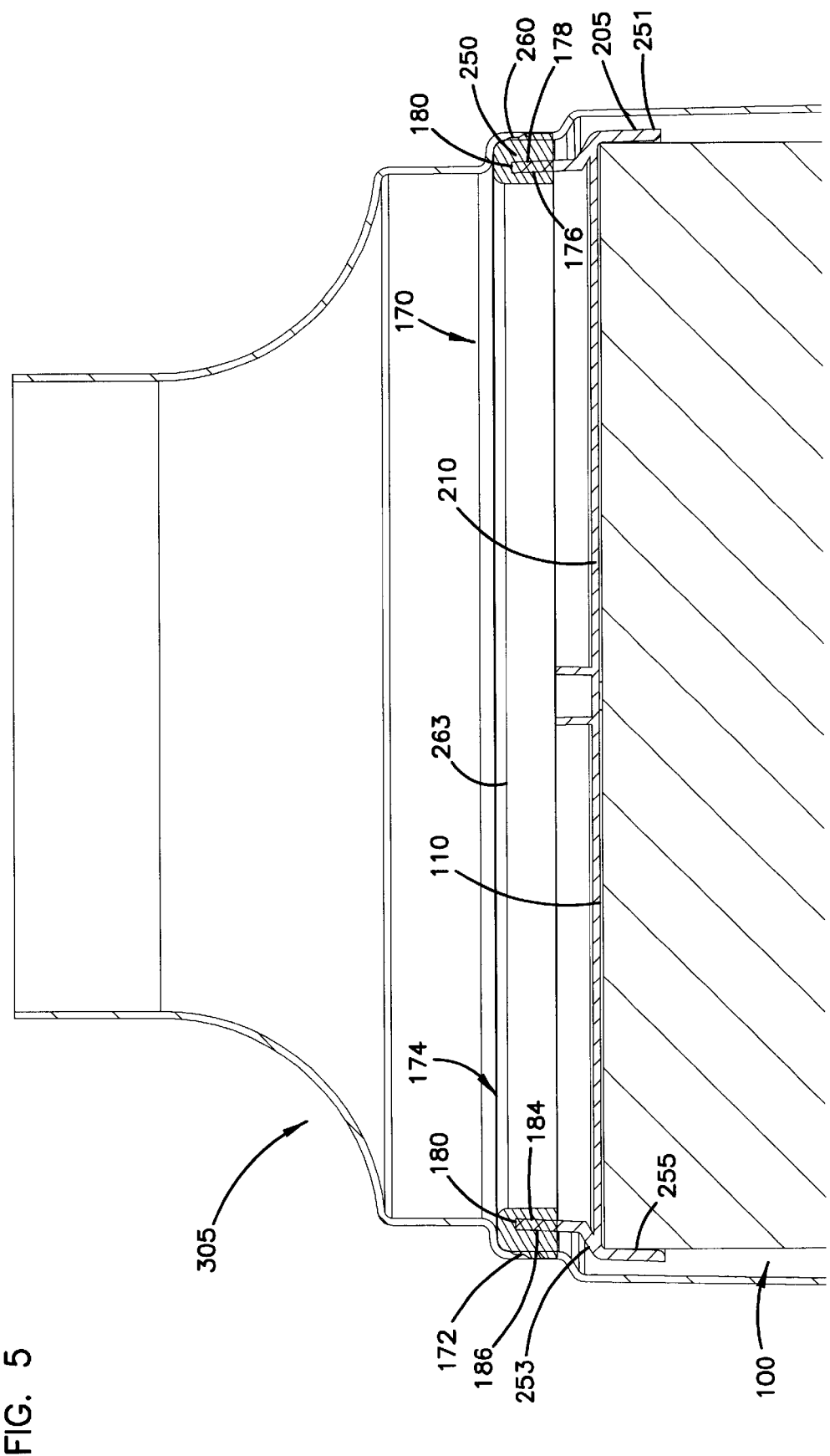
FIG. 5 is a schematic, fragmented, cross-sectional view of the arrangement of FIG. 1, depicted sealed in an air cleaner for use.

Referring now to FIG. 5, showing an enlarged, fragmented view of the filter construction 100 installed in the housing 305, the particular sealing system 60 depicted includes a frame construction 170 and a seal member 250. When this type of sealing system 60 is used, the frame construction 170 provides a support structure or backing against which the seal member 250 can be compressed against to form a radial seal 172 with the duct or housing 305.

Still in reference to FIG. 5, in the particular embodiment shown, the frame construction 170 includes a rigid projection 174 that projects or extends from at least a portion of one of the first and second flow faces 105, 110 of the filter construction 100. The rigid projection 174, in the particular arrangement shown in FIG. 5, extends axially from the second flow face 110 of the filter construction 100. The particular FIG. 5 embodiment shows the projection 174 axially projecting above the entire second flow face 110, due to the planar shape of the second flow face 110. In arrangements where the flow face is non-planar, such as frusto-conical, the projection 174 can be designed to project above only a portion of the flow face. For example, in a frusto-conical filter construction, there could be a center portion at or near the core that extends above the projection 174.

Figure 4:
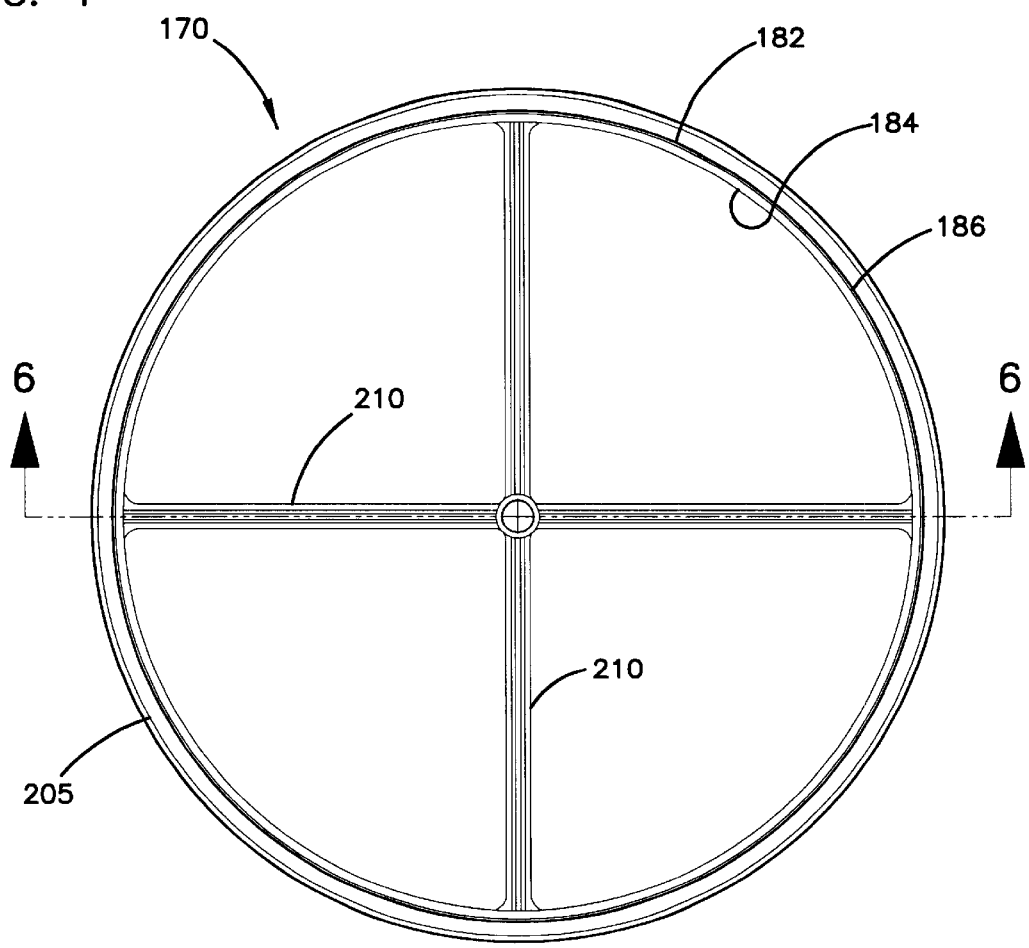
FIG. 4 is a schematic, plan view of one embodiment a sealing system of the filter pack of FIG. 1.
Figure 6:
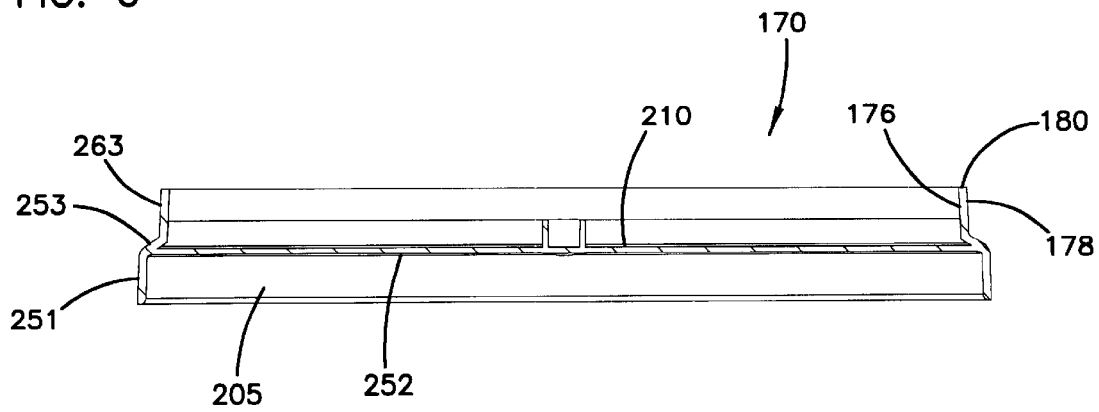
FIG. 6 is a schematic, cross-sectional view of the frame of the sealing system of FIG. 4, taken along the line 6—6 of FIG. 4.

FIG. 6 depicts a cross-sectional view the particular frame construction 170 depicted in FIG. 5. In FIG. 6, the projection 174 shown has a pair of opposite sides 176, 178 joined by an end tip 180. In preferred arrangements, one of the first and second sides 176, 178 will provide a support or backing to the seal member 250 such that a seal 172 can be formed between and against the selected side 176 or 178 and the appropriate surface of the housing or duct. When this type of construction is used, the projection 174 will be a continuous member forming a closed loop structure 182 (FIG. 4). The seal member 250 can engage or be adjacent to either an interior side 184 of the loop structure 182, or the exterior side 186 of the loop structure 182. When engaging the interior side 184 of the loop structure 182, the seal member 250 can be compressed between the projection 174 and a tubular member inserted within the loop, such that the projection 174 and seal member 250 circumscribes the tubular member. This would form a radial seal between and against the outer portion of the tubular member and the interior side 176 of the projection 174 (and the loop structure 182).

The seal member 250 can also engage the exterior portion 186 of the loop structure 182. When this type of construction is used, a housing or duct may circumscribe the projection 174 and loop structure 182 including the seal member 250 to form a seal between and against the outer side 178 of the projection 174 and an inner surface of the housing or duct.

In certain preferred arrangements, the seal member 250 engages or covers both of the interior side 184 and exterior side 186 of the loop structure 182. In the particular embodiment shown in FIG. 5, the seal member 250 engages the end tip 180 of the projection 174 as well, such that the seal member 250 covers the projection 174 from the exterior side 186, over the end tip 180, and to the interior side 184.

Attention is directed to FIGS. 4, 5 and 6. FIG. 4 is a schematic, plan view of the sealing system 60 of FIG. 1; FIG. 5 is a fragmented, schematic, cross-sectional view of the filter pack 50 of FIG. 1 installed in housing 305; and FIG. 6 is a schematic, cross-sectional view of the frame construction 170 of the sealing system 60 of FIG. 4.

In general, when using frame constructions 170 such as those described herein, the frame construction 170 will include a frame 205. The frame 205 may be a variety of shapes. In the particular embodiment illustrated in FIG. 4, the shape of the frame 205 is generally circular. The frame 205 depicted in FIG. 4 is convenient in that it is arranged and configured for attachment to the second flow face 110 of the filter construction 100.

Referring now to FIG. 6, in the particular arrangement depicted, the frame 205 has a band, skirt, or depending lip 251 that is generally circular and has an inside diameter. Preferably, the inside diameter is approximately equal to the outside diameter of the filter construction 100. The depending lip 251 depends or extends down a first distance from a bottom 252 surface of cross braces 210. The depending lip 251 is arranged and configured to extend radially around the second flow face 110 the filter construction 100. Referring now to FIG. 5, in the particular embodiment depicted, the depending lip 251 extends radially around the second flow face 110 of the filter media 100, such that the depending lip 251 extends inboard the first distance of the second flow face 110 of the filter construction 100, defining an overlap region 255.

The frame 205 is preferably secured to the filter construction 100. A variety of ways to secure the frame 205 to the filter construction 100 are possible. One particularly preferred way to secure the frame 205 to the filter construction 100 is by use of an adhesive. In the particular embodiment depicted in FIG. 5, the adhesive is oriented in the overlap region 255 between the depending lip 251 and the filter construction 100.

Preferably, the adhesive permanently affixes the frame 205 to the filter construction 100 while preventing the fluid from leaking out through the overlap region 255 between the filter construction 100 and the frame 205. In alternative embodiments, the frame 205 may be temporarily attached to the filter construction 100. By the term "temporarily," it is meant that the frame 205 may be removed from the filter construction 100 without damaging either the sealing system 60 or the filter construction 100.

During use of frames 205 of the type depicted herein, inward forces are exerted around the circumference of the frame 205. Cross braces 210 support the frame 205. By the term "support," it is meant that the cross braces 210 prevent the frame 205 from radially collapsing under the forces exerted around the circumference of the frame 205.

Referring again to FIG. 6, the particular projection 174 depicted preferably includes a tip portion 263, or annular sealing support. In the one depicted in FIG. 6, the tip portion 263 is generally circular and is arranged and configured for insertion into a housing or duct. When circular, the tip portion 263 defines an inside diameter. Between the tip portion 263 and the depending lip 251, the frame 205 includes a step 253. The step 253 provides a transition area between the larger inside diameter of the depending lip 251 and the smaller inside diameter of the tip portion 263.

When constructed according to the arrangement shown in FIGS. 5 and 6, the tip portion 263 provides support for the compressible seal member 250. The compressible seal member 250 is preferably constructed and arranged to be sufficiently compressible to be compressed between the tip portion 263 of the frame 205 and a sidewall 260 of a housing or duct. When sufficiently compressed between the tip portion 263 and the sidewall 260, radial seal 172 is formed between the filter pack 50 and the sidewall 260.

Figure 7:
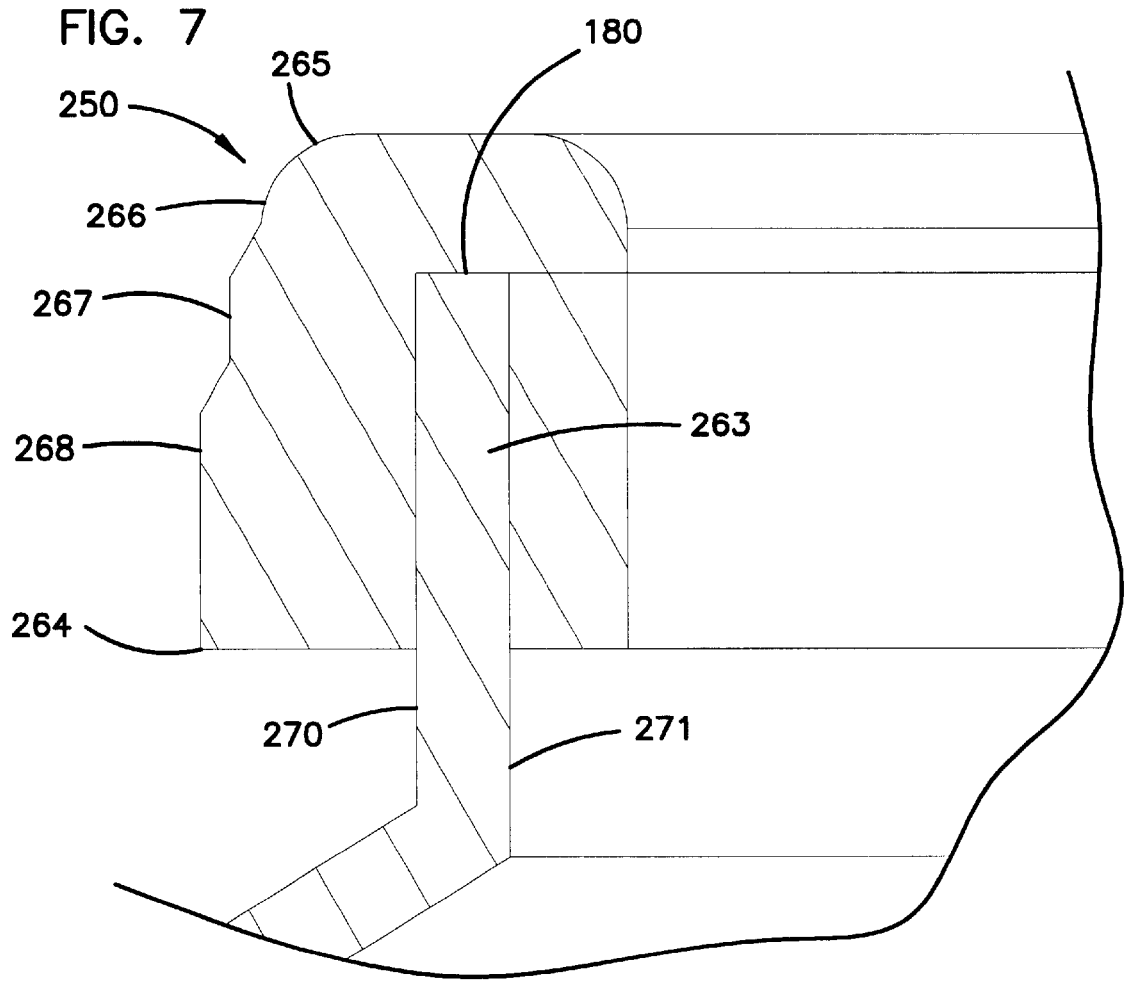
FIG. 7 is an enlarged fragmented schematic cross-sectional view of one embodiment the compressible seal member of the sealing system of FIG. 4, according to principles of this disclosure.

A variety of ways are possible to secure the seal member 250 to the tip portion 263. One particularly convenient and preferred way is by molding the seal member 250 to engage, cover, or overlap both the outer radial side 270 of the tip portion 263 and the inner radial side 271 of the tip portion 263, including the end tip 180 (FIG. 7). One particular embodiment of this configuration is depicted in FIG. 7. The seal member 250, in FIG. 7, completely covers the tip portion 263.

The tip portion 263 of the frame 205 defines a wall or support structure between and against which a radial seal 172 may be formed by the compressible seal member 250. The compression of the compressible seal member 250 at the sealing system 60 is preferably sufficient to form a radial seal under insertion pressures of no greater than 80 lbs., typically, no greater than 50 lbs., for example, about 20–40 lbs., and light enough to permit convenient and easy change out by hand. Preferably, the amount of compression of the compressible seal member 250 is at least fifteen percent, preferably no greater than forty percent, and typically between twenty and thirty-three percent. By "amount of compression" it is meant the physical displacement of an outermost portion of the seal member 250 radially toward the tip portion 263 as a percentage of the outermost portion of the seal member 250 in a resting, undisturbed state and not installed within a duct or subject to other forces.

Attention is directed to FIG. 7. FIG. 7 is an enlarged schematic, fragmented view of a particular preferred seal member 250 in an uncompressed state. In the preferred embodiment shown, the seal member 250 is a stepped cross-sectional configuration of decreasing outermost dimensions (diameter, when circular) from a first end 264 to a second end 265, to achieve desirable sealing. Preferred specifications for the profile of the particular arrangement shown in FIG. 7 are as follows: a polyurethane foam material having a plurality of (preferably at least three) progressively larger steps configured to interface with the sidewall 260 (FIG. 5) and provide a fluid-tight seal.

The compressible seal member 250 defines a gradient of increasing internal diameters of surfaces for interfacing with the sidewall 260. Specifically, in the example shown in FIG. 7, the compressible seal member 250 defines three steps 266, 267, 268. The cross-sectional dimension or width of the steps 266, 267, 268 increases the further the step 266, 267, 268 is from the second end 265 of the compressible seal member 250. The smaller diameter at the second end 265 allows for easy insertion into a duct or housing. The larger diameter at the first end 264 ensures a tight seal.

In general, for a properly functioning radially sealing structure, the compressible seal member 250 needs to be compressed when the element is mounted in the housing 305 or duct. In many preferred constructions, it is compressed between about fifteen percent and forty percent (often about twenty to thirty-three percent) of its thickness, in the thickest portion, to provide for a strong robust seal yet still be one that can result from hand installation of the element with forces on the order of 80 pounds or less, preferably 50 pounds or less, and generally 20–40 pounds.

In general, the filter pack 50 can be arranged and configured to be press-fit against the sidewall 260 of the housing 305 or duct. In the specific embodiment shown in FIG. 5, the compressible seal member 250 is compressed between the sidewall 260 and the tip portion 263 of the frame 205. After compression, the compressible seal member 250 exerts a force against the sidewall 260 as the compressible seal member 250 tries to expand outwardly to its natural state, forming radial seal 172 between and against the tip portion 263 and the sidewall 260.

B. FIGS. 8 and 9

Attention is directed to FIG. 8. FIG. 8 is a schematic, perspective view of an air cleaner 300. In certain systems, the filter pack 50 is designed to be inserted into a housing 305 of an air cleaner 300. The housing 305 is typically part of ductwork in airflow communication with an air intake system for an engine. As used herein, the term "ductwork" or "duct" will include structures such as pipes, tubes, and air cleaner housings.

A variety of housings are usable with the filter pack 50. In the particular embodiment depicted in FIG. 8, the housing 305 includes a body member or a first housing compartment 310 and a removable cover or second housing compartment 315. In some arrangements, the first housing compartment 310 is affixed to an object, such as a truck. The second housing compartment 315 is removably secured to the first housing compartment 310 by a latching device 320. Preferably, the latching device 320 includes a plurality of latches 325.

While the housing may have a variety of cross-sectional configurations, in the particular embodiment illustrated, the first and second housing compartments 310, 315 are circular. In the arrangement depicted, the first housing compartment 310 has an outlet region 330. The outlet region 330 is designed to allow the fluid to flow out of the filter assembly 300 during use. Similarly, the second housing compartment 315 has an inlet region 335. The inlet region 335 is designed to allow the fluid to flow into the filter assembly 300 during use. In preferred constructions, the housing 305 will be an in-line housing. As such, the outlet region 330 and inlet region 335 are coaxially aligned, to permit air to flow through the inlet region 335 and flow through the outlet region 330 in the same direction. This can be seen in FIG. 9.

The filter pack 50 is preferably constructed and arranged to be press-fit against the sidewall 260 of the housing 305. In the illustrated embodiment in FIG. 9, the second end 110 of the filter pack 50 with the attached frame 205 and compressible seal member 250 is inserted into the first housing compartment 310. The filter pack 50 is press-fit into the first housing compartment 310 such that the compressible seal member 250 is compressed between and against the tip portion 263 of the frame 205 and the sidewall 260 of the first housing compartment 310, to form radial seal 172 therebetween.

During use of the arrangement depicted in FIG. 9, the fluid enters the housing assembly 300 at the inlet region 335 of the second housing compartment 315, in the direction shown at 306. The fluid passes through the filter construction 100. As the fluid passes through the filter construction 100, contaminants are removed from the fluid. The fluid exits the housing assembly 300 at the outlet region 330, in the direction of 307. The compressible seal member 250 of the sealing system 60 forms radial seal 172 to prevent contaminated fluid from exiting the housing assembly 300, without first passing through the filter construction 100.

Figure 17:
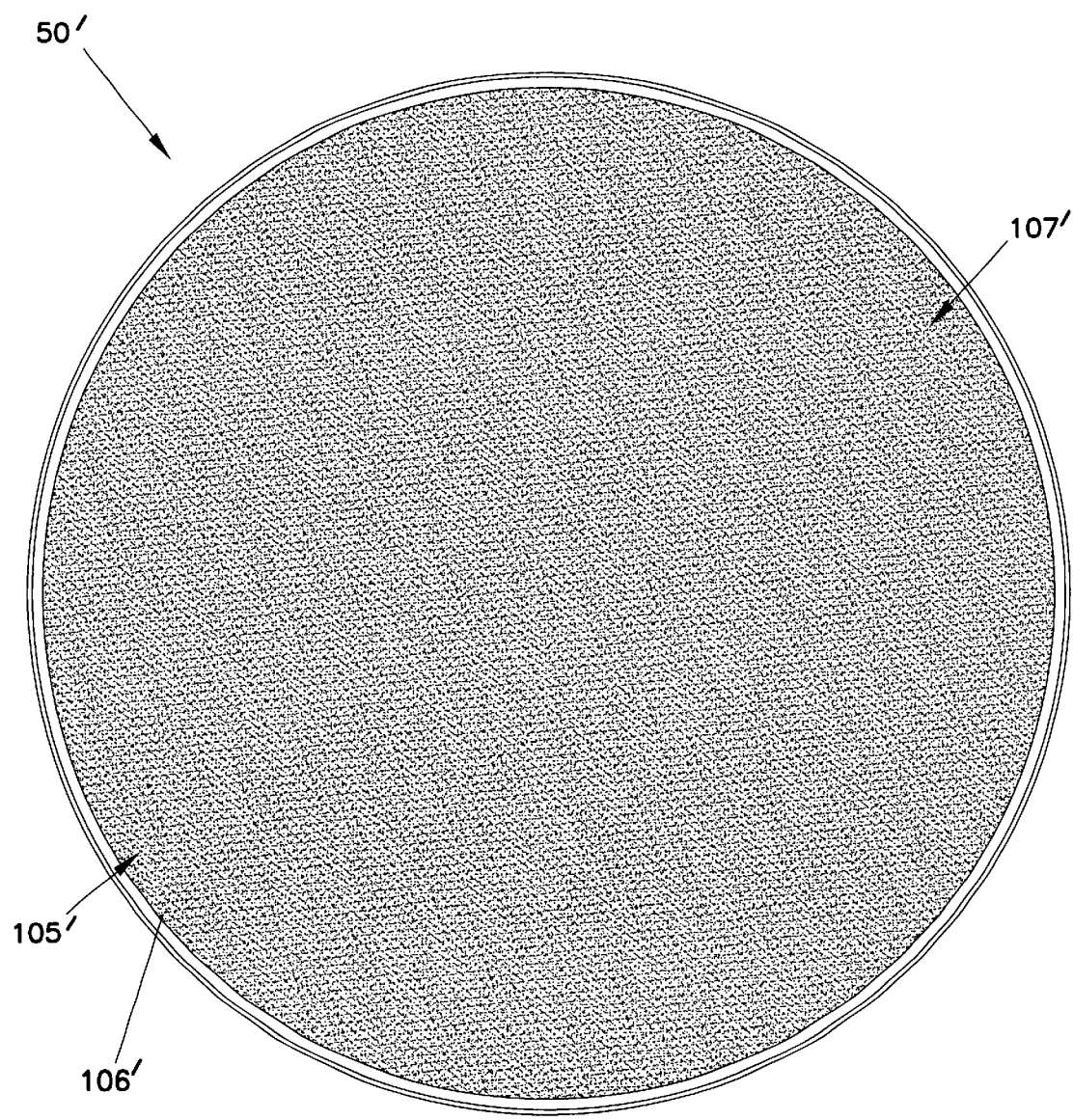
FIG. 17 is an end elevational view of an alternative embodiment of the filter pack depicted in FIG. 1.
Figure 18:
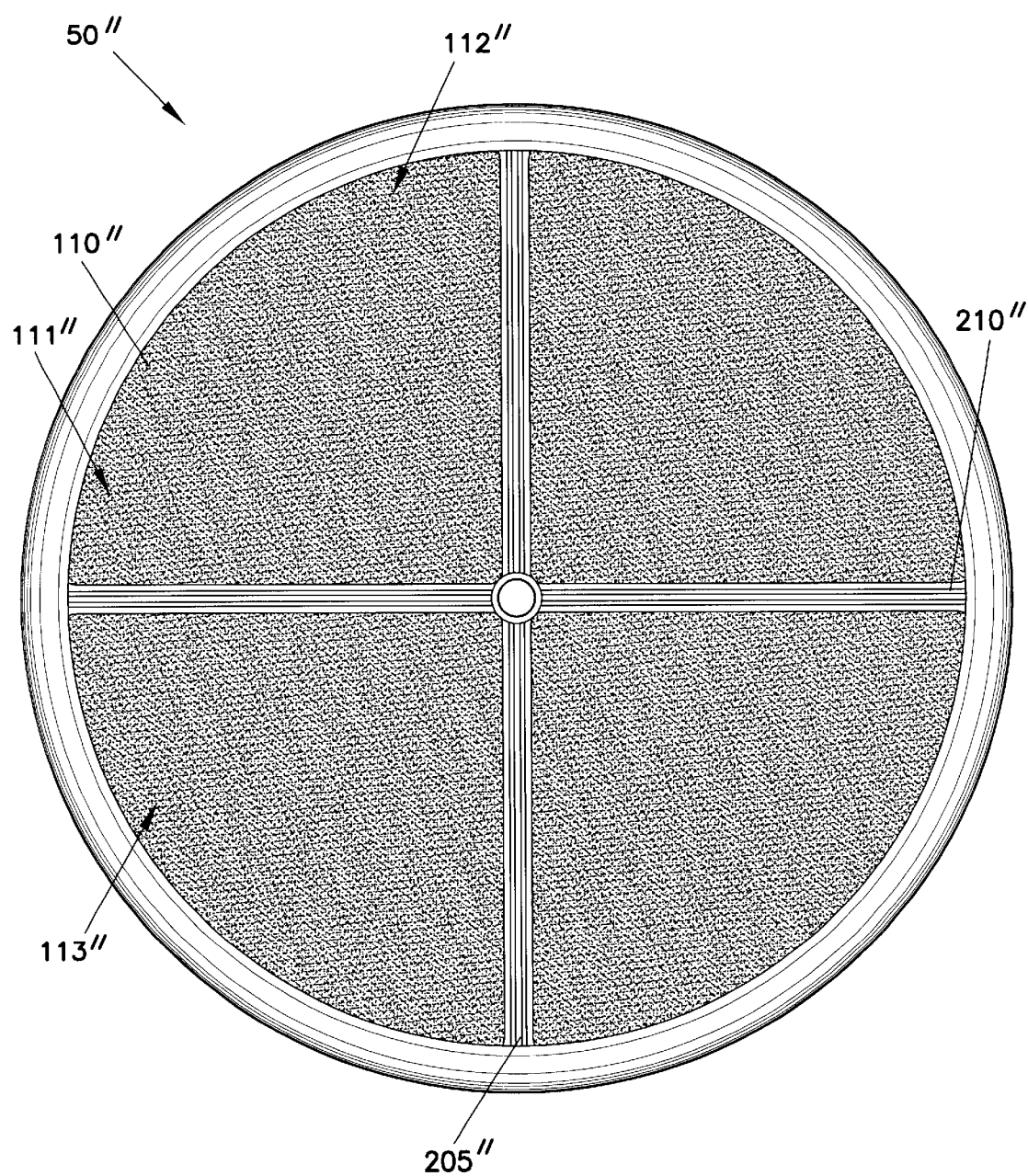
FIG. 18 is an end elevational view of another embodiment of the filter pack depicted in FIG. 1.

C. FIGS. 17 and 18

It should be appreciated that the filter pack 50 can have additional separators for ensuring that the appropriate degree of filtering is conducted. The separators can be either upstream of the filter pack 50 or downstream of the filter pack 50, depending upon the particular application and the desired results. These separators can take the form of pre-cleaners in some embodiments, or post-cleaners (such as safety filters or secondary filters). In addition, these separators may be in the form of single or multiple layers of filtering media, located either upstream or downstream of the filter construction 100. The filter media used in these applications will typically be selected based upon the degree of filtering desired and the amount of restriction introduced by the filter media. For example, it may be that in certain applications, it is desired to filter out large particles (that is, debris such as leaves, butterflies, clumps of dirt) while introducing little more additional restriction. In this application, a layer of media such as a sieve or screen can be used upstream of the filter construction 100. It may also be desired to introduce an additional amount of filtering just downstream of the filter construction 100. This can be accomplished by a layer (or multiple layers) of media immediately downstream of the filter construction 100.

Attention is directed to FIG. 17. FIG. 17 illustrates an alternative embodiment of the filter pack 50, shown generally at 50'. The filter pack 50' is configured and constructed analogously as the filter pack 50, illustrated in FIG. 1, with the exception of the first flow face 105', that corresponds to an upstream or an inlet end 106'. FIG. 17 illustrates an end elevational view of the filter pack 50', viewing the upstream end 106'. In the particular filter pack 50' illustrated in FIG. 17, the entire upstream end 106' is covered by a layer of media 107' for separating large particles from the gas stream before the gas stream reaches the filter construction 100. Depending upon the application and the desired degree of filtration and restriction, the media 107' can be of a variety of types. In many typical applications, the media 107' will be sized to allow for the removal of particles such as butterflies, leaves, large clumps of dirt, and other types of debris. One type of media usable has the following characteristics and properties: polyester material; 50% of the fibers being about 15 denier and 50% of the fibers being about 6 denier by weight; the binder holding the fibers together being oil resistant rubber modified PVC; a basis weight of 6.6 oz/yd$^2$ (224 g/m$^2$); a thickness of about 0.37 inches; a permeability of about 3500 ft/m in a 0.5 in. H$_2$O restriction.

As described above, it may also be desirable to introduce separation downstream of the filter construction 100. One example is illustrated in FIG. 18. FIG. 18 is an end elevational view of an alternative embodiment of the filter pack 55, as viewed from the second flow face 110". The filter pack 50" shown in FIG. 18 is constructed analogously as the filter pack 50 of FIG. 1, with the exception of an additional separator 111" located downstream of the filter construction 100. While a variety of embodiments are contemplated, in the particular embodiment illustrated in FIG. 18, the separator 111" is in the form of a layer of media 112" located downstream of the filter construction 100. The layer of media 112" can be either immediately adjacent and against the filter construction 100, or it may be located downstream of the frame 205". In the one illustrated in FIG. 18, the media 112" is immediately downstream of and against the filter construction 100. That is, the media 112" is located between the filter construction 100 and the cross braces 210" of the frame 205".

The type of media 112" utilized will depend upon the desired degree of filtering and the amount of restriction that is introduced. The media 112" can be a single layer or multiple layers. In the one illustrated in FIG. 18, the media 112" includes nonwoven, nonpleated, fibrous depth media 113". One usable material for depth media 113" has the following characteristics: 1 layer of 4.0–4.8 oz/yd$^2$ (136–163 g/m$^2$) polyester fiber depth media (mixed fibers); 0.55–0.70" (14–18 mm) thickness freestate (as measured under 0.002 psi compression); average fiber diameter about 21.0 micron (mass weighted average) or about 16.3 micron (length weighted average); permeability (minimum) 500 ft/min (152 m/min.); free state solidity about 0.6–1.0%, typically about 0.7%.

It is contemplated that in certain applications, it will be desired to have a filter pack 50 that includes both an upstream filter 107' and a downstream filter 111".

D. FIGS. 10–15

Figure 10:
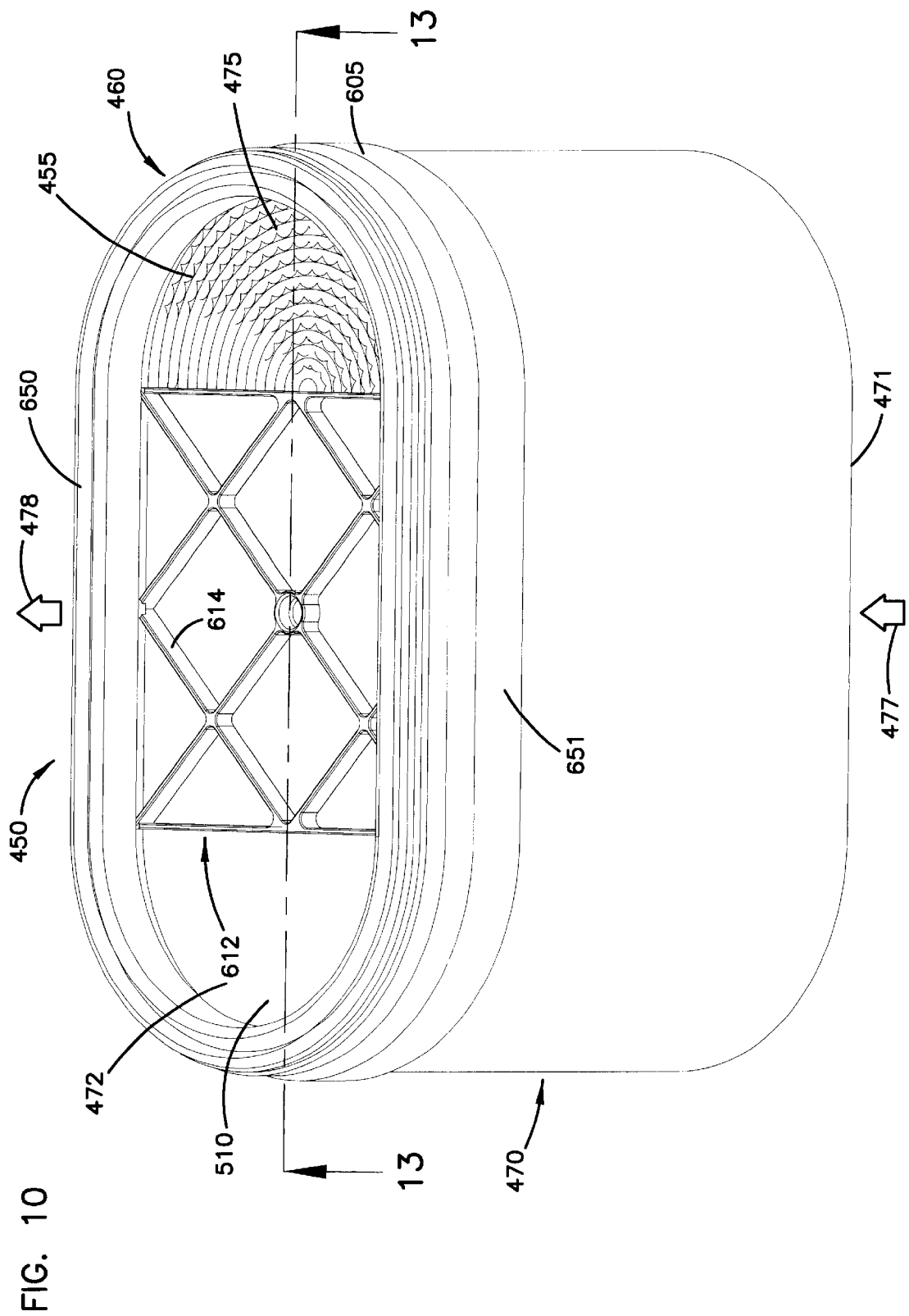
FIG. 10 is a schematic, perspective view of a first alternative embodiment of a filter pack, according to certain principles of this disclosure.

Attention is directed to FIG. 10. FIG. 10 is a perspective view of another embodiment of a filter pack 450. In the construction depicted, the filter pack 450 includes filter media 455 and a sealing system 460. The filter media 455 is designed to remove contaminants from a fluid, such as air, passing through the filter media 455. The sealing system 460 is designed to seal the filter media 455 to a housing or duct.

Figure 11:
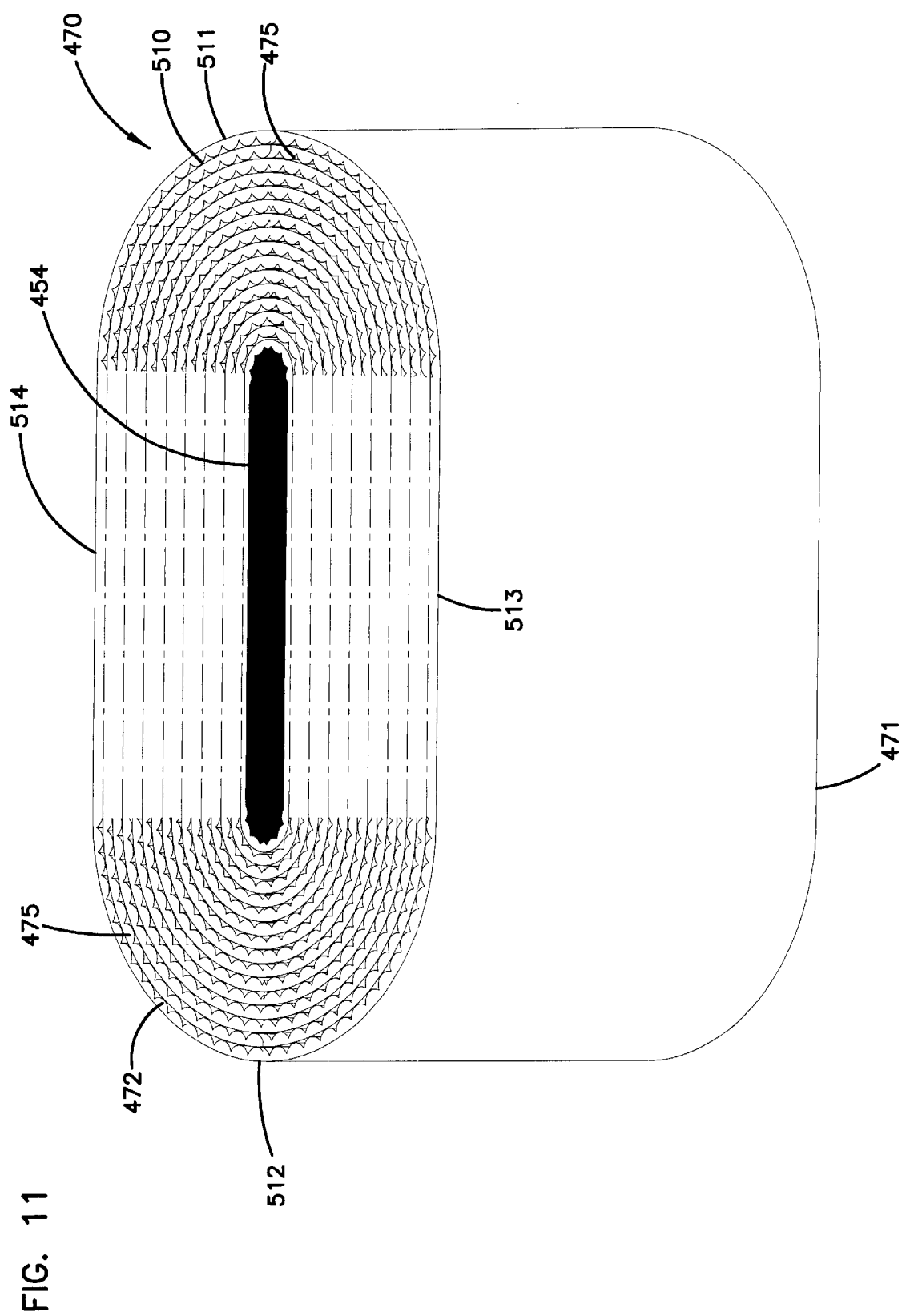
FIG. 11 is a schematic, perspective view of a filter media portion of the filter pack of FIG. 10.

In certain preferred arrangements, the filter media 455 will be configured in a filter construction 470 with a first flow face 471 and an opposite, second flow face 472. Attention is directed to FIG. 11. In the particular embodiment illustrated in FIG. 11, the filter construction 470 is configured for straight-through flow. This means, as explained above, that fluid to be filtered will enter the first flow face 471 in a certain direction 477 (FIG. 10) and exit the second flow face 472 in the same direction 478 (FIG. 10).

The filter construction 470 can have a variety of configurations and cross-sectional shapes. In the particular embodiment illustrated in FIG. 11, the filter construction 470 has a non-circular cross-section. In particular, the FIG. 11 embodiment of the filter construction 470 has an ob-round or "racetrack" cross-sectional shape. By "racetrack" cross-sectional shape, it is meant that the filter construction 470 includes first and second semicircular ends 511, 512 joined by a pair of straight segments 513, 514.

In general, the filter construction 470 will be a wound construction. That is, the construction 470 will include a layer of filter media that is turned completely or repeatedly about a centerpoint. In certain preferred arrangements, the wound construction will be a coil, in that a layer of filter media will be rolled a series of turns about a centerpoint. In further preferred arrangements, the filter construction 470 will be a rolled construction, typically a roll of filter media, for example permeable fluted filter media.

Many different ways of manufacturing the media construction 470 can be used. In some techniques, a single-faced filter media, such as the filter media 122 illustrated in FIG. 2, is wound about a center mandrel or other structure to provide a mounting member for winding. The center mandrel may be removed or left to plug the center of the filter construction 470. In the particular embodiment shown in FIG. 11, a center core 454 is illustrated as occupying the center of the coil of filter media 455.

In FIGS. 10 and 11, certain portions 475 are depicted showing the flutes, including the open and closed ends. It should be understood that this portion or section 475 is representative of the entire flow face 472 (as well as the first flow face 471). For the sake of clarity and simplicity, the flutes are not depicted in the other remaining portions of the flow face 472. Top and bottom plan views, as well as side elevational views of the filter pack 450 usable in the systems and arrangements described herein are depicted in copending and commonly assigned U.S. patent application Ser. No. 29/101,193, filed Feb. 26, 1999, and entitled, "Filter Element Having Sealing System," herein and incorporated by reference.

As with the embodiment of FIG. 1, the filter pack 450 includes a sealing system 460. In preferred constructions, the sealing system 460 includes a frame 605 and a seal member 650.

Figure 12:
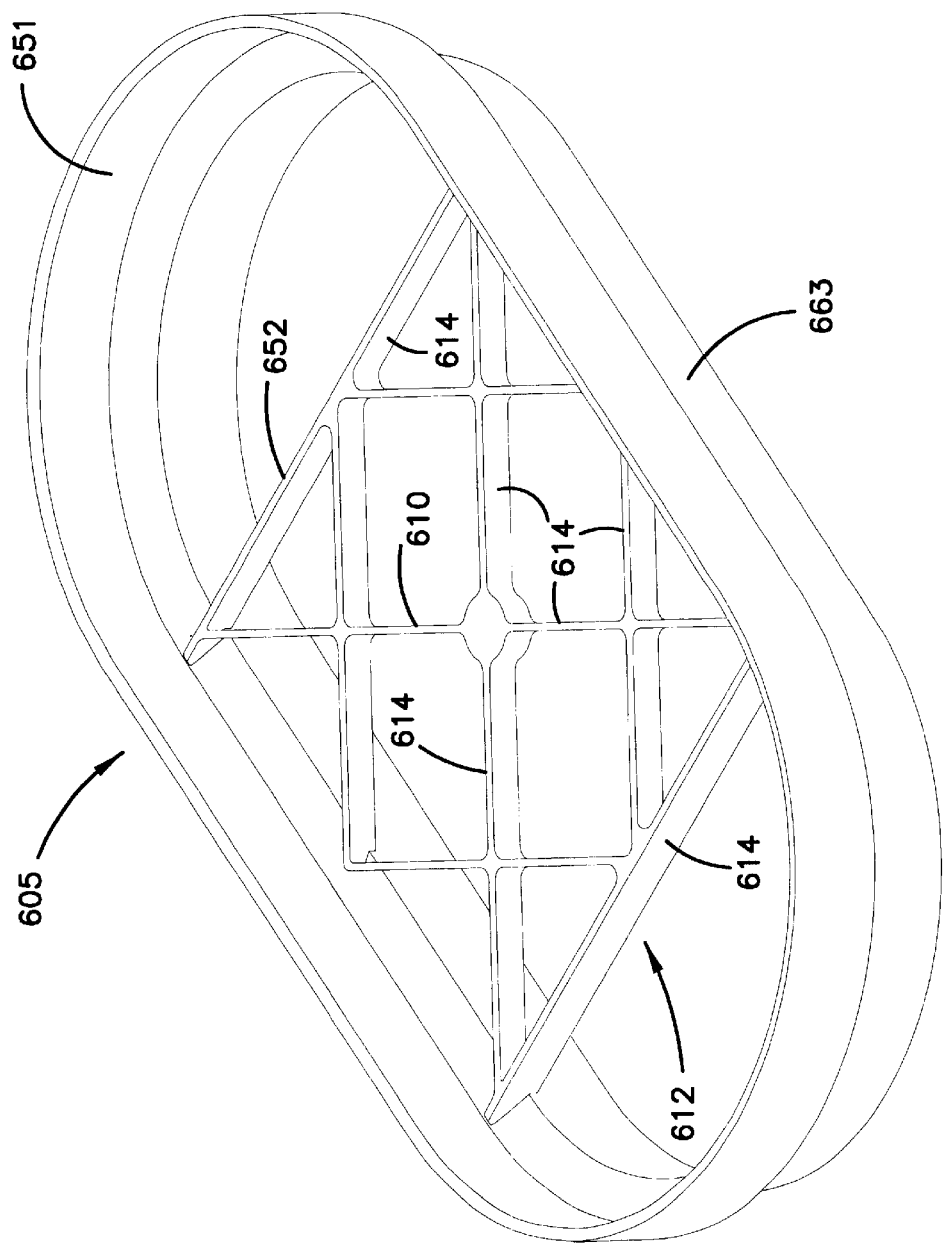
FIG. 12 is a schematic, perspective view of one embodiment of a frame portion for a sealing system of the filter pack depicted in FIG. 10.

While a variety of configurations are contemplated herein, one particularly preferred embodiment of the frame 605 is shown in perspective view in FIG. 12.

Figure 15:
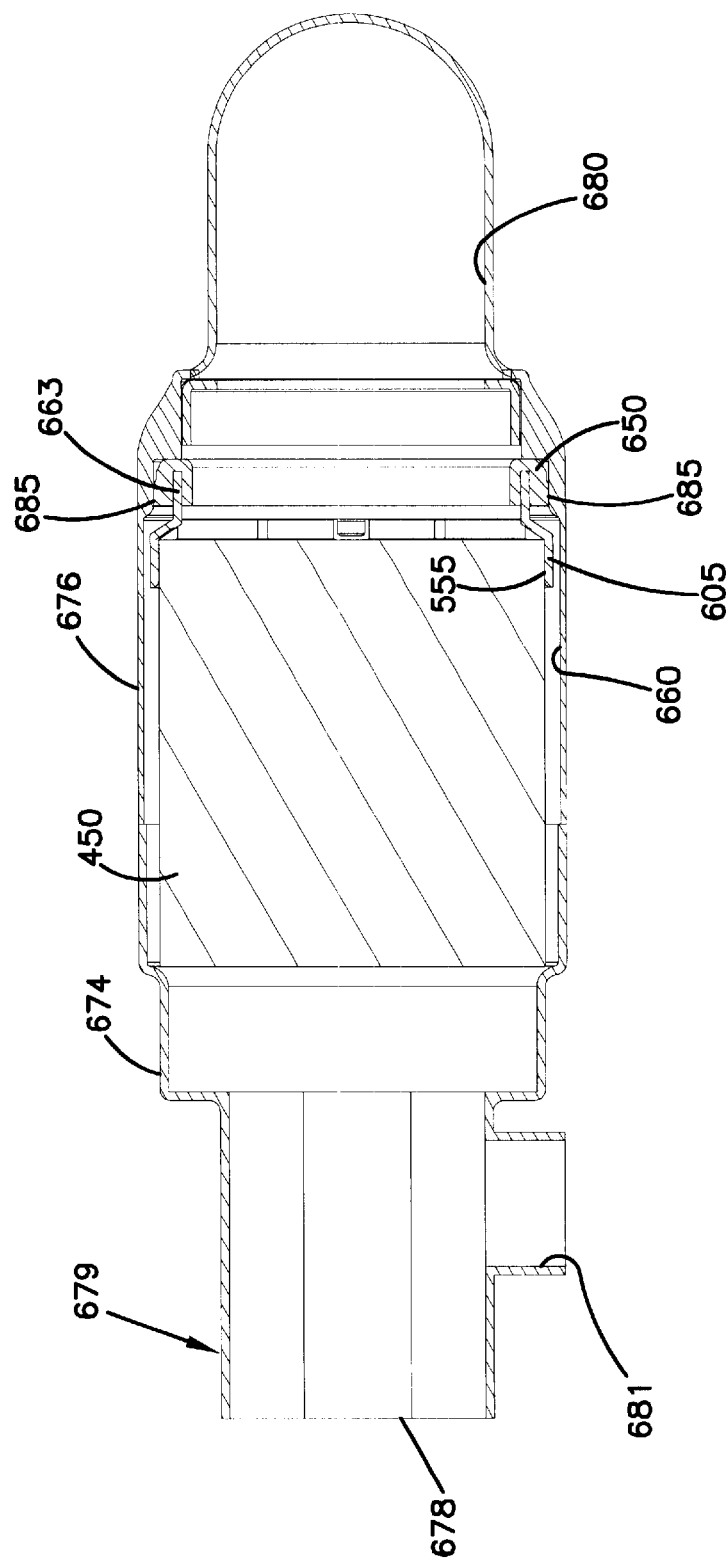
FIG. 15 is a schematic, cross-sectional view of the air cleaner depicted in FIG. 14 and taken along the line 15—15 and showing the filter pack of FIG. 10 installed within.

In the particular arrangement depicted in FIG. 12, the frame 605 has a non-circular, for example, obround and in particular, a racetrack shape and is arranged and configured for attachment to the second end 510 of the filter media 455. In particular, the frame 605 has a band or skirt or depending lip 651 that is generally racetrack shaped. The depending lip 651 depends or extends down a distance from a bottom surface 652 of cross braces 610. The depending lip 651 is arranged and configured to extend radially around the second end 570 of filter construction 470. Referring now to FIG. 10, in the embodiment depicted, the depending lip 651 of the frame 605 extends radially around the second end 510 of the filter construction 470, such that the depending lip 651 extends inboard the distance from bottom surface 652 of cross braces 610 of the second end 510 of the filter construction 470, defining an overlap region 555 (FIG. 15).

The frame 605 can be secured to the filter construction 470 in a number of ways. One particularly convenient way is by securing the frame 605 to the filter construction 470 by adhesive. In the specific embodiment illustrated and FIG. 15, the adhesive is placed in the overlap region 555 between the frame 605 and the filter construction 470 as previously described herein.

During use of the arrangements depicted, inward forces are exerted around the circumference of the frame 605. Inward forces exerted against the semicircular ends 511, 512 can cause the straight segments 513, 514 to bow or bend. Structure is provided as part of the frame 605 to prevent the straight segments 513, 514 from bowing. While a variety of structures are contemplated herein, in the particular embodiment illustrated in FIG. 12, cross braces 610 are provided to provide structural rigidity and support to the straight segments 513, 514. As can be seen in FIG. 12, the particular cross braces 610 depicted form a truss system 612 between the opposing straight segments 513, 514. The truss system 612 includes a plurality of rigid struts 614, preferably molded as a single piece with the remaining portions of the frame 605.

Figure 13:
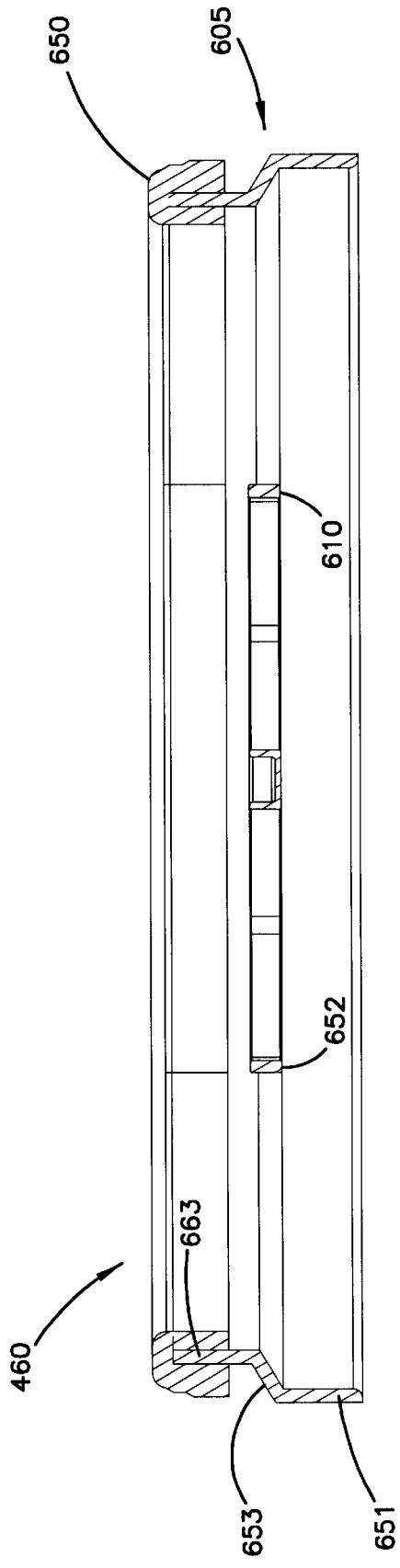
FIG. 13 is a schematic, cross-sectional view of one embodiment of the sealing system usable in the filter pack depicted in FIG. 10, taken along the line 13—13 of FIG. 10.

In certain preferred constructions, the frame 605 is constructed analogously to the frame 205. As such, and in reference now to FIGS. 12 and 13, the frame 605 includes a tip portion 663. In preferred arrangements, the tip portion 663 acts as an annular sealing support. In the construction depicted, the tip portion 663 has the same cross-sectional configuration as the filter construction 470. In the particular embodiment illustrated in FIG. 12, the tip portion is noncircular, specifically, racetrack shaped. In preferred implementations, and in reference to the particular embodiment shown in FIG. 13, between the tip portions 663 and the depending lip 651, the frame 605 includes a step 653. The step 653 provides a transition area between the cross-sectional width of the depending lip 651 and the smaller cross-sectional width of the tip portion 663.

In preferred systems, the compressible seal member 650 has structure analogous to the that of the compressible seal member 250 of FIG. 7.

Figure 14:
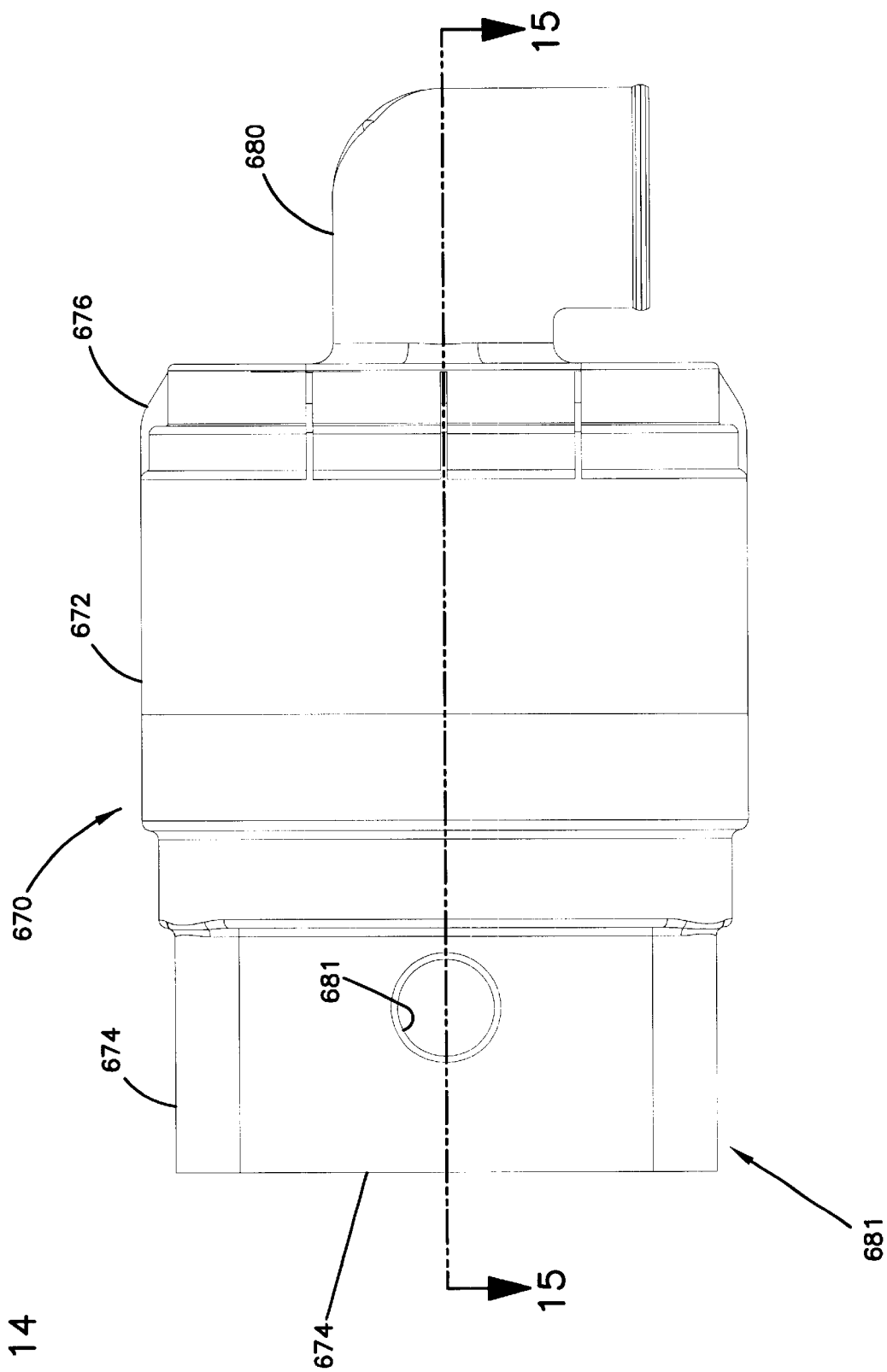
FIG. 14 is a schematic, side elevational view of an alternate embodiment of an air cleaner, according to principles of this disclosure.

Preferably, the filter pack 450 will be installed in a duct or an air cleaner housing. In certain preferred applications, the air cleaner housing will be an in-line housing. FIG. 14 illustrates an air cleaner 670 having one type of in-line housing 672. In FIG. 14, the housing depicted is a two-piece housing including a cover 674 and a body member 676. The cover 674 defines an airflow inlet 678. The body member 676 defines an airflow outlet 680. The housing further includes a pre-cleaner arrangement 679 upstream of the filter pack 450, such as that described in U.S. Pat. Nos. 2,887,177 and 4,162,906, incorporated by reference herein. In the one depicted, the pre-cleaner arrangement 679 is in the cover 674. The cover 674 includes a dust ejector 681 that expels dust and debris collected in the pre-cleaner 679.

FIG. 15 is a schematic cross-sectional view of the air cleaner 670 of FIG. 14 and showing the filter pack 450 installed therewithin.

The compressible seal member 650 is compressed between the sidewall 660 and the tip portion 663 of the frame 605. As the filter pack 450 is press-fit, the compressible seal member 650 is compressed between and against the frame 605 (specifically, in the particular embodiment shown, the tip portion 663) and the sidewall 660. After compression, the compressible seal member 650 exerts a force against the sidewall 660 as the compressible seal member 650 tries to expand outwardly to its natural state, forming a radial seal 685 with the sidewall 660.

E. Systems and Methods of Operation

Figure 16:
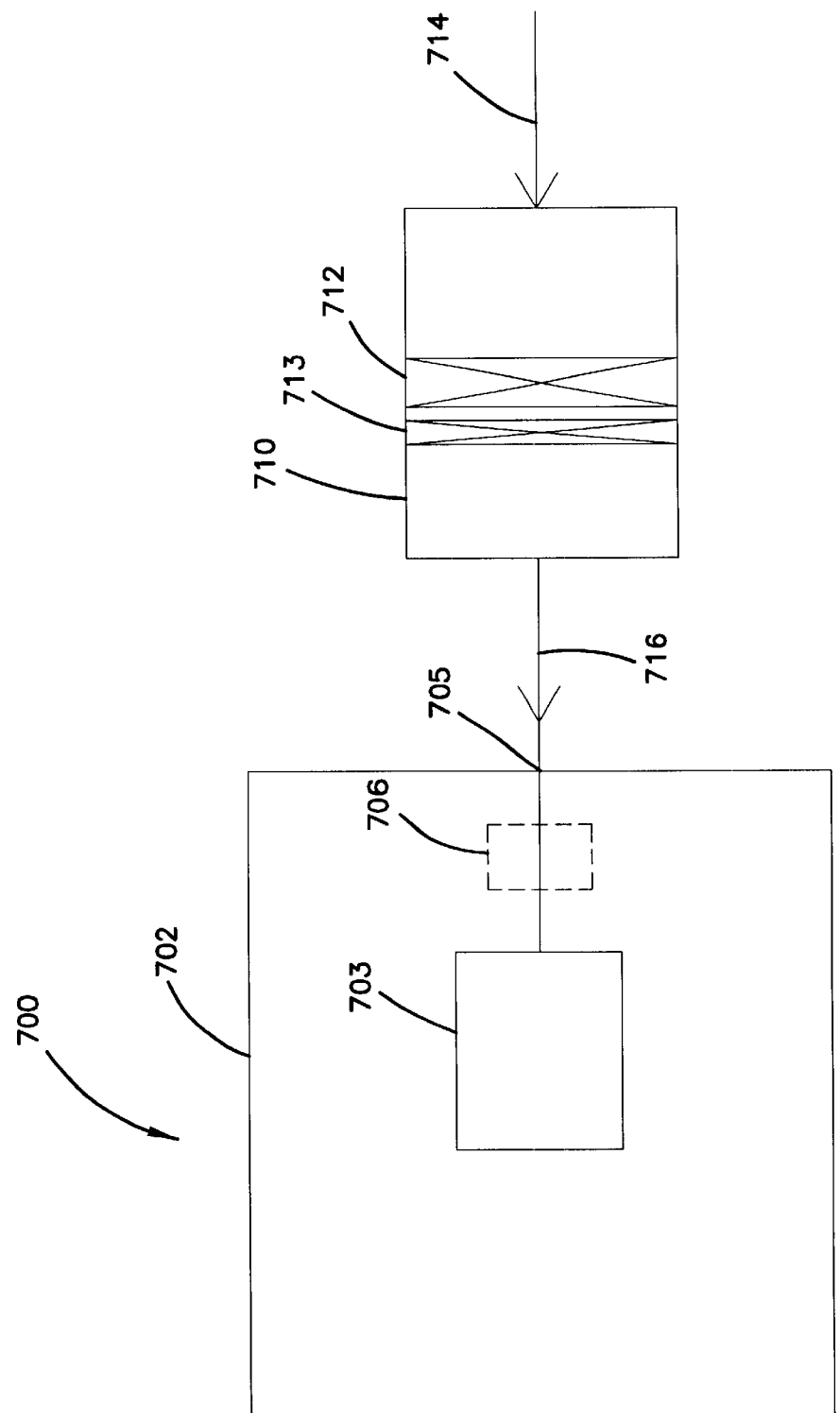
FIG. 16 is a schematic view of one embodiment of a system in which air cleaners according to the present disclosure are used.

The filter constructions and arrangements described herein are usable in a variety of systems. One particular type of system is depicted schematically in FIG. 16 generally at 700. In FIG. 16, equipment 702, such as a vehicle, having an engine 703 with some defined rated air flow demand, for example at least 500 cfm, and typically 700–1200 cfm is shown schematically. The equipment 702 may comprise a bus, an over-the-highway truck, an off-road vehicle, a tractor, or marine application such as a powerboat. The engine 703 powers the equipment 702, through use of an air and fuel mixture. In FIG. 16, air flow is shown drawn into the engine 703 at an intake region 705. An optional turbo 706 is shown in phantom, as optionally boosting the air intake into the engine 703. An air cleaner 710 having a filter construction 712 and a secondary element 713 is upstream of the engine 703 and the turbo 706. In general, in operation, air is drawn in at arrow 714 into the air cleaner 710 and through a primary element 712 and secondary element 713. There, particles and contaminants are removed from the air. The cleaned air flows downstream at arrow 716 into the intake 705. From there, the air flows into the engine 703 to power the equipment 702.

F. Change Out and Replacement

In certain preferred applications, the filter packs described herein are removable and replaceable from whatever system in which they are installed. For example, the filter pack 50, or filter pack 650, will be installed in an air cleaner housing such as those shown in FIGS. 9 and 15, respectively. After a certain number of hours of use, the media in the filter constructions will become occluded, and the restriction in the filter packs will increase. In preferred applications, the filter packs will be periodically replaced to maintain the appropriate removal of particulates from a fluid, without introducing too high of a restriction.

In some applications, the filter constructions herein will include a visual indicator of useful life. Some systems may include a restriction indicator to provide information to the user regarding the appropriate time to change out the filter pack.

To service the air cleaner arrangements described herein, the user will need access the filter pack. For example, if the filter pack is installed in an air cleaner housing such as those shown in FIG. 9 or FIG. 15, the user will unlatch the cover from the body member, and remove the cover from the body member. This will expose an opening. The user will grasp the filter pack and break the radial seal formed by the filter pack against the sidewall of the housing or duct. In certain systems, the seal member and the housing or duct will be designed such that the user will need to exert a force of no more than about 80 lbs., preferably no more than 50 lbs., and in some applications between 15 and 40 lbs. to break the radial seal and remove the filter pack. The user will then pull the filter pack through the opening formed by the body member. The old filter pack may then be disposed of. In certain preferred systems, the filter pack will be constructed of non-metallic materials, such that it is readily incineratable. For example, in some preferred constructions, the filter pack will comprise at least 95 percent, and typically at least 98 percent nonmetallic materials.

To install a new filter pack, the user grasps the filter pack and inserts it through an opening in the duct or housing. The filter pack is inserted into the opening until the seal member is sufficiently compressed against the inner annular wall of the housing to form a radial seal between and against the housing wall and the tip portion of the frame. The cover may then be oriented over the exposed end of the filter pack to close the opening. The cover may then be latched to the body member.

G. Example Construction

In this section, examples are provided of a set of operating specifications. These are intended as an example. A wide variety of alternate sizes can be used.

1. FIGS. 1–8.

The axial length of the filter media 100 of FIG. 2 will be between 3 inches (about 8 cm) and 10 inches (about 25 cm), and in one example would be approximately 6 inches (about 15 cm). The outside diameter of the filter media 100 will be between 3 inches (about 38 cm) and 15 inches (about 38 cm), and in one example would be approximately 10 inches (about 25 cm).

The distance (FIG. 5) that the depending lip 251 of the frame 205 (FIG. 5) extends inboard of the second end 110 (FIG. 5) of the filter construction 100 will be between 0.2 inches (about 5 mm) and 1 inch (about 2.5 cm), and in one example would be 0.6 inches (about 1.5 cm). The diameter of the depending lip 251 will be between 3 inches (about 7 cm) and 15 inches (about 38 cm), and in one example would be approximately 10 inches (about 25 cm). The diameter of the tip portion 263 will be between 2.5 inches (about 6 cm) and 14 inches (36 cm), and in one example would be approximately 9.5 inches (about 24 cm).

The filter element will provide at least 5 sq. ft and typically 20–130 sq. ft., for example about 45 sq. ft. of media surface area. It will occupy a volume of no greater than about 1 ft$^3$, and typically between 0.03–0.5 ft$^3$, and for example about 0.2–0.4 ft$^3$.

2. FIG. 9

The diameter of the outlet region 330 (FIG. 9) of the first housing compartment 310 (FIG. 9) will be between 3 inches (about 8 cm) and 10 inches (about 25 cm), and in one example would be 7 inches (about 18 cm). The diameter (FIG. 9) of the inlet region 335 (FIG. 9) of the second housing compartment 315 (FIG. 9) will be between 3 inches (about 8 cm) and 10 inches (about 25 cm), and in one example would be 5.8 inches (about 15 cm).

3. FIGS. 10–14

The axial length of the filter construction 470 will be between 3 inches (about 8 cm) and 10 inches (about 25 cm), and in one example would be approximately 6 inches (about 15 cm). The semicircular ends 511, 512 will have a radius of between 1 inch (about 2.5 cm) and 5 inches (about 13 cm), and in one example have a radius of 2.7 inches (about 7 cm). The straight segments 513, 514 will have a length greater than 0.1 inches (about 2.5 mm), and in one example, would be 4.9 inches (about 12 cm).

Preferably, the distance that the frame 605 extends inboard of the filter construction 470 will be between 0.2 inches (about 5 mm) and 1 inch (about 2.5 cm), and in one example would be 0.6 inches (about 1.5 cm).

The filter element will provide at least 5 sq. ft and typically 20–130 sq. ft., for example about 45 sq. ft. of media surface area. It will occupy a volume of no greater than about 1 ft$^3$, and typically between 0.03–0.5 ft$^3$, and for example about 0.2–0.4 ft$^3$.

H. Example Materials

In this section, examples are provided of usable materials. The particular choice for any given material will vary, depending on the filtering application. In other words, the particular material selected for the systems usable herein will be decided upon by the system designer based on the system requirements. A variety of materials are possible. The following section provides examples of materials that have been found to be suitable.

The media 122 can comprise cellulose. One example of media usable in the system described above is as follows: cellulose media with the following properties: a basis weight of about 45–55 lbs./3000 ft$^2$ (84.7 g/m$^2$), for example, 48–54 lbs./3000 ft$^2$; a thickness of about 0.005–0.015 in, for example about 0.010 in. (0.25 mm); frazier permeability of about 20–25 ft/min, for example, about 22 ft/min (6.7 m/min); pore size of about 55–65 microns, for example, about 62 microns; wet tensile strength of at least about 7 lbs/in, for example, 8.5 lbs./in (3.9 kg/in); burst strength wet off of the machine of about 15–25 psi, for example, about 23 psi (159 kPa).

The cellulose media can be treated with fine fiber, for example, fibers having a size (diameter) of 5 microns or less, and in some instances, submicron. A variety of methods can be utilized for application of the fine fiber to the media. Some such approaches are characterized, for example, in U.S. Pat. No. 5,423,892, column 32, at lines 48–60. More specifically, such methods are described in U.S. Pat. Nos. 3,878,014; 3,676,242; 3,841,953; and 3,849,241, incorporated herein by reference. An alternative is a trade secret approach comprising a fine polymeric fiber web positioned over conventional media, practiced under trade secret by Donaldson Company under the designation ULTRA-WEB®. With respect to the configurations of the filter element and the operation of the sealing system, there is no particular preference for: how the fine fibers are made; and, what particular method is used to apply the fine fibers. Enough fine fiber would be applied until the resulting media construction would have the following properties: initial efficiency of 99.5% average, with no individual test below 90%, tested according to SAE J726C, using SAE fine dust; and an overall efficiency of 99.98% average, according to SAE J726C.

The frame 205 (FIG. 5) will be constructed of a material that will provide structural integrity and is not subject to creep. The frame 205 will be constructed of a non-metallic material such that it is environmentally friendly and either recyclable or readily incineratable. The frame 205 can be constructed from most plastics, for example, glass reinforced plastic. One usable reinforced plastic is propylene or nylon. Of course, other suitable materials may be used.

The compressible seal member 250 (FIG. 6) can be made from a variety of materials. There is no particular preference, provided that the seal member 250 forms a seal in the proper location under compression. One usable material will be a soft polymeric material, such as foamed urethane. One example usable material includes foamed polyurethane, processed to an end product having an "as molded" density of fourteen to twenty-two pounds per cubic foot. Foamed polyurethanes are available from a variety of sources, such as BASF Corporation of Wyandotte, Mich. One example of a foamed polyurethane comprises a material made with I35453R resin and I305OU isocyanate, which is sold exclusively to the assignee Donaldson by BASF Corporation.

The materials should be mixed in a mix ratio of 100 parts I35453 resin to 36.2 parts I305OU isocyanate (by weight). The specific gravity of the resin is 1.04 (8.7 pounds/gallon), and for the isocyanate it is 1.20 (10 pounds/gallon). The materials are typically mixed with a high dynamic shear mixer. The component temperatures should be seventy to ninety-five degrees Fahrenheit. The mold temperatures should be 115–135 degrees Fahreiheit.

The resin material I35453R has the following description:
(a) Average molecular weight
　1) Base polyether polyol=500–15,000
　2) Diols=60–10,000
　3) Triols=500–15,000
(b) Average functionality
　1) total system=1.5–3.2
(c) Hydroxyl number
　1) total systems=100–300
(d) Catalysts
　1) amine=Air Products 0.1–3.0 PPH
　2) tin=Witco 0.01–0.5 PPH
(e) Surfactants
　1) total system=0.1–2.0 PPH
(f) Water
　1) total system=0.03–3.0 PPH
(g) Pigments/dyes
　1) total system=1–5% carbon black
(h) Blowing agent
　1) 0.1–6.0% HFC 134A.

The I305OU isocyanate description is as follows:
(a) NCO content—22.4–23.4 wt%
(b) Viscosity, cps at 25° C.=600–800
(c) Density=1.21 g/cm$^3$ at 25° C.
(d) Initial boiling pt.—190° C. at 5 mm Hg
(e) Vapor pressure=0.0002 Hg at 25° C.
(f) Appearance—colorless liquid
(g) Flash point (Densky-Martins closed cup)=200° C.

The above is a complete description of principles of the invention. Many embodiments can be made according to principles of this disclosure.

We claim:

1. A filter element arrangement for use in an air cleaner housing having an internal annular sealing surface; the filter element arrangement being removable and replaceable within the air cleaner housing upon relative axial movement between the filter element arrangement and the internal annular sealing surface of the housing; the filter element arrangement comprising:
　(a) a coiled media construction having: first and second ends; a first flow face at the first end; and a second flow face at the second end;
　　(i) the media within said coiled media construction forming a plurality of flutes; each of the flutes having a first end positioned adjacent to the first flow face and a second end positioned adjacent to the second flow face;
　　　(A) a first set of selected ones of the flutes being open at the first end and closed at the second end; and
　　　(B) a second set of selected ones of said flutes being closed at the first end and open at the second end;
　　(ii) said coiled media construction having a longitudinal axis passing through the first flow face and the second flow face;
　(b) a sealing system including a frame construction and a seal member;
　　(i) the frame construction including an extension projecting axially from one of the first and second flow faces and in a same direction as the longitudinal axis;
　　　(A) the extension of the frame construction having an outer circumferential surface;
　　　(B) the extension of the frame construction being an annular sealing support for the seal member;

(ii) the seal member being positioned on, and being supported by, the extension of the frame construction;
  (A) at least a portion of the seal member being positioned on and peripherally around the outer circumferential surface of the extension;
  (B) the seal member including an outwardly directed, peripheral, sealing surface, the seal member peripheral sealing surface being oriented to form a releasable, peripherally directed, seal between the filter element arrangement and a housing internal annular sealing surface, as a result of axial insertion of the filter element arrangement into the air cleaner housing, by compression of the seal member between and against the annular sealing support of the extension and the internal annular scaling surface of the housing.

2. A filter element arrangement according to claim 1 wherein:
(a) said coiled media construction comprises a sheet of corrugations secured to a face sheet and configured into a coil.

3. A filter element arrangement according to claim 1 wherein:
(a) the coiled media construction has a cross-section including a pair of curved ends joined by a pair of straight segments.

4. A filter element arrangement according to claim 3 wherein:
(a) the frame construction extension includes a pair of curved ends joined by a pair of straight segments.

5. A filter element arrangement according to claim 1 wherein:
(a) the frame construction includes supporting cross braces.

6. A filter element arrangement according to claim 5 further comprising:
(a) a region of depth media between the coiled media construction and the cross braces.

7. A filter element arrangement according to claim 1 wherein:
(a) the outwardly directed, peripheral, surface of the seal member defines a cross-sectional configuration of steps increasing from an end tip of the extension toward a lip member.

8. A filter element arrangement according to claim 1 wherein:
(a) the outer circumferential surface of the frame construction extension is continuous and uninterrupted.

9. A filter element arrangement according to claim 1 wherein:
(a) said frame construction extension includes an end tip; an outer surface, and an opposite inner surface; and
(b) said seal member includes: a first portion being oriented against said outer surface of said extension; a second portion oriented against said end tip; and a third portion oriented against said inner surface.

10. A filter element arrangement according to claim 1 wherein:
(a) said seal member comprises compressible polyurethane foam.

11. A method of constructing a filter element arrangement; the method comprising:
(a) providing a coiled media construction;
  (i) the coiled media construction having: first and second ends; a first flow face at the first end; and a second flow face at the second end;
  (ii) the media within the coiled media construction forming a plurality of flutes; each of the flutes having a first end positioned adjacent to the first flow face and a second end positioned adjacent to the second flow face;
    (A) a first set of selected ones of the flutes being open at the first end and closed at the second end; and
    (B) a second set of selected ones of the flutes being closed at the first end and open at the second end;
  (iii) the coiled media construction having a longitudinal axis passing through the first flow face and the second flow face; and
(b) securing a sealing system including a frame construction and a seal member to one of the first and second ends of the coiled media construction;
  (i) the frame construction including an extension projecting axially and in a same direction as the longitudinal axis;
  (ii) the seal member being positioned on, and being supported by, the extension of the frame construction;
    (A) at least a portion of the seal member being positioned on and peripherally around an outer circumferential surface of the extension.

12. A method according to claim 11 wherein:
(a) the step of providing a coiled media construction includes providing a coiled media construction having a cross-section including a pair of curved ends joined by a pair of straight segments.

13. A method according to claim 12 wherein:
(a) the step of securing a sealing system includes securing a sealing system having a frame construction extension that includes a pair of curved ends joined by a pair of straight segments.

14. A method according to claim 11 wherein:
(a) the step of securing a sealing system includes securing a sealing system having a seal member that defines a cross-sectional configuration of steps increasing from an end tip of the extension.

15. An air cleaner comprising:
(a) a housing; and
(b) an air filter element operably positioned within said housing; said air filter element comprising:
  (i) a coiled media construction having: first and second ends; a first flow face at the first end; and a second flow face at the second end;
  (ii) the media within said coiled media construction forming a plurality of flutes; each of the flutes having a first end positioned adjacent to the first flow face and a second end positioned adjacent to the second flow face;
    (A) a first set of selected ones of the flutes being open at the first end and closed at the second end; and
    (B) a second set of selected ones of said flutes being closed at the first end and open at the second end;
  (iii) said coiled media construction having a longitudinal axis passing through the first flow face and the second flow face;
  (iv) a sealing system including a frame construction and a seal member;
  (v) the frame construction including an extension projecting axially from one of the first and second flow faces and in a same direction as the longitudinal axis;
    (A) the extension of the frame construction having an outer circumferential surface;
    (B) the extension of the frame construction being an annular sealing support for the seal member; and (vi) the seal member being positioned on, and being supported by, the extension of the frame construction;
   (A) at least a portion of the seal member being positioned on and peripherally around the outer circumferential surface of the extension;
   (B) the seal member including an outwardly directed, peripheral, sealing surface; the seal member peripheral sealing surface forming a seal between the filter element and the housing by compression of the seal member between and against the annular sealing support of the extension and the housing.

16. An air cleaner according to claim 15 wherein:
(a) said housing comprises a body member and a removable cover.

17. An air cleaner according to claim 15 wherein:
(a) said seal member comprises compressible polyurethane foam.

18. An air cleaner according to claim 15 wherein:
(a) said coiled media construction comprises a sheet of corrugations secured to a face sheet and configured into a coil.

19. An air cleaner according to claim 15 wherein:
(a) the housing includes an air inlet, and the first flow face comprises an inlet end of the coiled media construction; and
(b) the air filter element further includes a layer of media covering the inlet end.

20. An air cleaner according to claim 15 wherein:
(a) the coiled media construction has a cross-section including a pair of curved ends joined by a pair of straight segments.

* * * * *

UNITED STATES PATENT AND TRADEMARK OFFICE
CERTIFICATE OF CORRECTION

PATENT NO. : 6,350,291 B1
DATED : February 26, 2002
INVENTOR(S) : Gieseke et al.

It is certified that error appears in the above-identified patent and that said Letters Patent is hereby corrected as shown below:

Title page,
Item [56], U.S. PATENT DOCUMENTS, "Paul" should read -- Pall --.

Column 17,
Line 17, "scaling" should read -- sealing --.

Signed and Sealed this

Eighth Day of October, 2002

Attest:

Attesting Officer

JAMES E. ROGAN
Director of the United States Patent and Trademark Office